US012812184B2

(12) United States Patent
Budagavi et al.

(10) Patent No.: US 12,812,184 B2
(45) Date of Patent: Nov. 24, 2026

(54) BASEMESH ENTROPY CODING IMPROVEMENTS IN VIDEO-BASED DYNAMIC MESH CODING (V-DMC)

(71) Applicant: Samsung Electronics Co., Ltd., Suwon-si (KR)

(72) Inventors: Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/094,772

(22) Filed: Mar. 28, 2025

(65) Prior Publication Data

US 2025/0310575 A1 Oct. 2, 2025

Related U.S. Application Data

(60) Provisional application No. 63/672,501, filed on Jul. 17, 2024, provisional application No. 63/668,640, filed on Jul. 8, 2024, provisional application No. 63/666,528, filed on Jul. 1, 2024, provisional application No. 63/572,579, filed on Apr. 1, 2024.

(51) Int. Cl.
*H04N 19/91* (2014.01)
*H04N 19/172* (2014.01)

(52) U.S. Cl.
CPC .......... *H04N 19/91* (2014.11); *H04N 19/172* (2014.11)

(58) Field of Classification Search
CPC ...... H04N 19/91; H04N 19/172; H04N 19/13; H04N 19/593; H04N 19/597; H04N 19/70
See application file for complete search history.

(56) References Cited

U.S. PATENT DOCUMENTS

2011/0262867 A1* 10/2011 Uno .......................... G03F 1/70 716/52
2022/0108484 A1 4/2022 Ray et al.
2022/0239956 A1 7/2022 Tourapis et al.
2023/0298216 A1* 9/2023 Zhang .................. H04N 19/105
(Continued)

FOREIGN PATENT DOCUMENTS

WO 2024/030279 A1 2/2024

OTHER PUBLICATIONS

International Search Report and Written Opinion for PCT/KR2025/004283 by Korean Intellectual Property Office dated Jun. 27, 2025.
(Continued)

*Primary Examiner* — Richard T Torrente

(57) ABSTRACT

An apparatus directed to improvements for basemesh entropy coding in an inter-coded basemesh frame is provided. The apparatus decodes a basemesh frame. The apparatus arithmetically decodes one or more codewords corresponding to one or more predictions errors associated with the basemesh frame, wherein the one or more prediction errors are associated with a fine category or a coarse category. In some cases, the apparatus can further assign one or more contexts for decoding the one or more codewords corresponding to the one or more prediction errors. In some examples, the apparatus also shares one or more contexts to be used for the one or more prediction errors associated with the fine category or the coarse category.

20 Claims, 21 Drawing Sheets

(56) References Cited

U.S. PATENT DOCUMENTS

| | | | | |
|---|---|---|---|---|
| 2023/0388544 | A1* | 11/2023 | Xu | H04N 19/46 |
| 2024/0022708 | A1* | 1/2024 | Tian | G06T 9/001 |
| 2024/0022765 | A1 | 1/2024 | Tourapis et al. | |
| 2024/0048763 | A1* | 2/2024 | Tian | H04N 19/597 |
| 2024/0064334 | A1* | 2/2024 | Huang | H04N 19/12 |
| 2024/0089499 | A1 | 3/2024 | Nguyen Canh et al. | |
| 2025/0016337 | A1* | 1/2025 | Kammachi Sreedhar | H04N 19/30 |
| 2025/0238960 | A1* | 7/2025 | Nguyen Canh | G06T 9/001 |

OTHER PUBLICATIONS

Zou, Wenjie et al., ISO/IEC JTC 1/SC 29/WG 7 N00874, "Video-based dynamic mesh coding test model v8.0 user manual", WG 7, MPEG 3D Graphics Coding, Jun. 2024.

ISO/IEC JTC 1/SC 29/WG 7 N00885, "Information technology—Coded representation of immersive media—Part 29: Video-based dynamic mesh coding (V-DMC), CD Stage", ISO 23090-29:2024(E), Jun. 2024.

ISO/IEC JTC 1/SC 29/WG 7 N01027, "Information technology—Coded representation of immersive media—Part 29: Video-based dynamic mesh coding (V-DMC), DIS Stage", ISO 23090-29:2024(E), Dec. 2024.

ISO/IEC JTC 1/SC 29/WG 7 N01099, "Information technology—Coded representation of immersive media—Part 29: Video-based dynamic mesh coding (V-DMC), Technologies for V-DMC stage", ISO 23090-29:2024(E), Feb. 2025.

* cited by examiner

FIG. 12A

| | | | | | | | | | | | | |
|---|---|---|---|---|---|---|---|---|---|---|---|---|
| TU Contexts 1205 | A0 | A1 | A1 | A1 | A1 | A1 | A1 | | | | | |
| EG Prefix Contexts 1210 | B0 | B1 | B2 | B3 | B4 | B5 | B5 | B5 | B5 | B5 | B5 | B5 |
| EG Suffix Contexts 1215 | C0 | C1 | C2 | C3 | C4 | C5 | C5 | C5 | C5 | C5 | C5 | C5 |

FIG. 12B

| | | | | | | | | | | | | |
|---|---|---|---|---|---|---|---|---|---|---|---|---|
| TU Contexts 1220 | A0 | A1 | A2 | A2 | A2 | A2 | A2 | | | | | |
| EG Prefix Contexts 1225 | B0 | B1 | B2 | B2 | B2 | B2 | B2 | B2 | B2 | B2 | B2 | B2 |
| EG Suffix Contexts 1230 | C0 | C1 | C2 | C2 | C2 | C2 | C2 | C2 | C2 | C2 | C2 | C2 |

FIG. 12C

| | | | | | | | | | | | | |
|---|---|---|---|---|---|---|---|---|---|---|---|---|
| TU Contexts 1235 | A0 | A1 | A1 | A1 | A1 | A1 | A1 | | | | | |
| EG Prefix Contexts 1240 | B0 | B1 | B2 | B3 | B4 | B5 | B5 | B5 | B5 | B5 | B5 | B5 |
| EG Suffix Contexts 1245 | C0 | C1 | C2 | C3 | C4 | C5 | C5 | C5 | C5 | C5 | C5 | C5 |

FIG. 12D

| | | | | | | | | | | | | |
|---|---|---|---|---|---|---|---|---|---|---|---|---|
| TU Contexts 1250 | A0 | A1 | A2 | A2 | A2 | A2 | A2 | | | | | |
| EG Prefix Contexts 1255 | B0 | B1 | B2 | B2 | B2 | B2 | B2 | B2 | B2 | B2 | B2 | B2 |
| EG Suffix Contexts 1260 | C0 | C1 | C2 | C2 | C2 | C2 | C2 | C2 | C2 | C2 | C2 | C2 |

FIG. 16A

| | | | | | | | | | | | | |
|---|---|---|---|---|---|---|---|---|---|---|---|---|
| TU Contexts 1205 | A0 | A1 | A1 | A1 | A1 | A1 | A1 | | | | | |
| EG Prefix Contexts 1210 | B0 | B1 | B2 | B3 | B4 | B4 | B4 | B4 | B4 | B4 | B4 | B4 |
| EG Suffix Contexts 1215 | C0 | C1 | C2 | C3 | C4 | C4 | C4 | C4 | C4 | C4 | C4 | C4 |

FIG. 16B

| | | | | | | | | | | | | |
|---|---|---|---|---|---|---|---|---|---|---|---|---|
| TU Contexts 1220 | A0 | A1 | A2 | A2 | A2 | A2 | A2 | | | | | |
| EG Prefix Contexts 1225 | B0 | B1 | B2 | B3 | B4 | B4 | B4 | B4 | B4 | B4 | B4 | B4 |
| EG Suffix Contexts 1230 | C0 | C1 | C2 | C3 | C4 | C4 | C4 | C4 | C4 | C4 | C4 | C4 |

FIG. 16C

| | | | | | | | | | | | | |
|---|---|---|---|---|---|---|---|---|---|---|---|---|
| TU Contexts 1235 | A0 | A1 | A1 | A1 | A1 | A1 | A1 | | | | | |
| EG Prefix Contexts 1240 | B0 | B1 | B2 | B3 | B3 | B3 | B3 | B3 | B3 | B3 | B3 | B3 |
| EG Suffix Contexts 1245 | C0 | C1 | C2 | C3 | C3 | C3 | C3 | C3 | C3 | C3 | C3 | C3 |

FIG. 16D

| | | | | | | | | | | | | |
|---|---|---|---|---|---|---|---|---|---|---|---|---|
| TU Contexts 1250 | A0 | A1 | A2 | A2 | A2 | A2 | A2 | | | | | |
| EG Prefix Contexts 1255 | B0 | B1 | B2 | B3 | B3 | B3 | B3 | B3 | B3 | B3 | B3 | B3 |
| EG Suffix Contexts 1260 | C0 | C1 | C2 | C3 | C3 | C3 | C3 | C3 | C3 | C3 | C3 | C3 |

FIG. 17A

| | | | | | | | | | | | | |
|---|---|---|---|---|---|---|---|---|---|---|---|---|
| TU Contexts 1705 | A0 | A1 | A1 | A1 | A1 | A1 | A1 | | | | | |
| EG Prefix Contexts 1710 | B0 | B1 | B2 | B3 | B4 | B | B | B | B | B | B | B |
| EG Suffix Contexts 1715 | C0 | C1 | C2 | C3 | C4 | C4 | C4 | C4 | C4 | C4 | C4 | C4 |

FIG. 17B

| | | | | | | | | | | | | |
|---|---|---|---|---|---|---|---|---|---|---|---|---|
| TU Contexts 1720 | A0 | A1 | A2 | A2 | A2 | A2 | A2 | | | | | |
| EG Prefix Contexts 1725 | B0 | B1 | B2 | B3 | B4 | B | B | B | B | B | B | B |
| EG Suffix Contexts 1730 | C0 | C1 | C2 | C3 | C4 | C4 | C4 | C4 | C4 | C4 | C4 | C4 |

FIG. 17C

| | | | | | | | | | | | | |
|---|---|---|---|---|---|---|---|---|---|---|---|---|
| TU Contexts 1735 | A0 | A1 | A1 | A1 | A1 | A1 | A1 | | | | | |
| EG Prefix Contexts 1740 | B0 | B1 | B2 | B3 | B3 | B | B | B | B | B | B | B |
| EG Suffix Contexts 1745 | C0 | C1 | C2 | C3 | C3 | C3 | C3 | C3 | C3 | C3 | C3 | C3 |

FIG. 17D

| | | | | | | | | | | | | |
|---|---|---|---|---|---|---|---|---|---|---|---|---|
| TU Contexts 1750 | A0 | A1 | A2 | A2 | A2 | A2 | A2 | | | | | |
| EG Prefix Contexts 1755 | B0 | B1 | B2 | B3 | B3 | B | B | B | B | B | B | B |
| EG Suffix Contexts 1760 | C0 | C1 | C2 | C3 | C3 | C3 | C3 | C3 | C3 | C3 | C3 | C3 |

FIG. 18A

| | | | | | | | | | | | | |
|---|---|---|---|---|---|---|---|---|---|---|---|---|
| TU Contexts 1805 | A0 | A1 | A1 | A1 | A1 | A1 | A1 | | | | | |
| EG Prefix Contexts 1810 | B0 | B1 | B2 | B3 | B4 | B4 | B | B | B | B | B | B |
| EG Suffix Contexts 1815 | C0 | C1 | C2 | C3 | C4 | C4 | B | B | B | B | B | B |

FIG. 18B

| | | | | | | | | | | | | |
|---|---|---|---|---|---|---|---|---|---|---|---|---|
| TU Contexts 1820 | A0 | A1 | A2 | A2 | A2 | A2 | A2 | | | | | |
| EG Prefix Contexts 1825 | B0 | B1 | B2 | B3 | B4 | B4 | B | B | B | B | B | B |
| EG Suffix Contexts 1830 | C0 | C1 | C2 | C3 | C4 | C4 | B | B | B | B | B | B |

FIG. 18C

| | | | | | | | | | | | | |
|---|---|---|---|---|---|---|---|---|---|---|---|---|
| TU Contexts 1835 | A0 | A1 | A1 | A1 | A1 | A1 | A1 | | | | | |
| EG Prefix Contexts 1840 | B0 | B1 | B2 | B3 | B3 | B3 | B | B | B | B | B | B |
| EG Suffix Contexts 1845 | C0 | C1 | C2 | C3 | C3 | C3 | B | B | B | B | B | B |

FIG. 18D

| | | | | | | | | | | | | |
|---|---|---|---|---|---|---|---|---|---|---|---|---|
| TU Contexts 1850 | A0 | A1 | A2 | A2 | A2 | A2 | A2 | | | | | |
| EG Prefix Contexts 1855 | B0 | B1 | B2 | B3 | B3 | B3 | B | B | B | B | B | B |
| EG Suffix Contexts 1860 | C0 | C1 | C2 | C3 | C3 | C3 | B | B | B | B | B | B |

BASEMESH ENTROPY CODING IMPROVEMENTS IN VIDEO-BASED DYNAMIC MESH CODING (V-DMC)

CROSS REFERENCE TO RELATED APPLICATION

This application claims benefit of U.S. Provisional Application No. 63/572,579 entitled "BASEMESH ENTROPY CODING IMPROVEMENTS IN V-DMC" filed on Apr. 1, 2024, U.S. Provisional Application No. 63/666,528 entitled "BASEMESH ENTROPY CODING IMPROVEMENTS IN V-DMC" filed on Jul. 1, 2024, U.S. Provisional Application No. 63/668,640 entitled "BASEMESH ENTROPY CODING IMPROVEMENTS IN V-DMC" filed on Jul. 8, 2024, and U.S. Provisional Application No. 63/672,501 entitled "BASEMESH ENTROPY CODING IMPROVEMENTS IN V-DMC" filed on Jul. 17, 2024, in the United States Patent and Trademark Office, the entire contents of which are hereby incorporated by reference.

TECHNICAL FIELD

The disclosure relates to improvements to video-based compression of dynamic meshes, and more particularly to, for example, but not limited to, improvements to a basemesh entropy coding.

BACKGROUND

Currently, International Organization for Standardization (ISO)/International Electrotechnical Commission (IEC) subcommittee 29 working group 07 (ISO/IEC SC29/WG07) is working on developing a standard for video-based compression of dynamic meshes. For example, the committee is working on a video-based dynamic mesh coding (V-DMC) standard that specifies syntax, semantics, and decoding for V-DMC, basemesh coding, Moving Picture Experts Group (MPEG) edgebreaker static mesh coding, and arithmetic coded displacement. In an embodiment, an eighth test model for V-DMC Test Model for Mesh (TMM) volume 8.0, was established in a $14^{th}$ meeting of ISO/IEC SC29 WG07 in June 2024. Draft specification for video-based compression of dynamic meshes is also available.

In an example, a mesh is a basic element in a three-dimensional (3D) computer graphics model. In an embodiment, a mesh is composed of several polygons that describe a boundary surface of a volumetric object. In such embodiments, each polygon is defined by its vertices in a three-dimensional (3D) space and information on how the vertices are connected is referred to as connectivity information. Additionally, vertex attributes can be associated with the mesh vertices. For example, the vertex attributes can include colors, normal, etc. In some cases, attributes are also associated with the surface of the mesh by exploiting mapping information that describes a parameterization of the mesh onto two-dimensional (2D) regions of the plane. In some embodiments, such mapping is described by a set of parametric coordinates, referred to as (U,V) coordinates or texture coordinates. In some embodiments, if the connectivity or attribute information changes, the mesh is called a dynamic mesh. In some embodiments, dynamic meshes contain large amount of data and are therefore standardized by the MPEG.

In some examples, a basemesh has a smaller number of vertices compared to an original mesh. For example, the basemesh is created and compressed either in a lossy or lossless manner. In some embodiments, a reconstructed basemesh undergoes subdivision and then a displacement field between the original mesh and the subdivided reconstructed basemesh is calculated. In at least some embodiments, during inter coding of mesh frame, the basemesh is coded by sending vertex motions instead of compressing the basemesh directly.

However, the basemesh entropy coding can be complicated and additional simplicities are desired.

The description set forth in the background section should not be assumed to be prior art merely because it is set forth in the background section. The background section may describe aspects or embodiments of the present disclosure.

SUMMARY

In some embodiments, this disclosure may relate to improvements to basemesh entropy coding. Specifically, this disclosure may relate to improvements related to prediction error information (e.g., geometry prediction errors or texture coordinates prediction error).

In some embodiments, the Moving Picture Experts Group (MPEG) edgebreaker static mesh codec introduced in the test model V-DMC TMM 8.0 may be used. This MPEG edgebreaker static mesh codec allows arithmetically decoding prediction errors and assigning them one or more contexts for decoding as described herein.

An aspect of the present disclosure provides a computer-implemented method for decoding a basemesh frame. The method includes arithmetically decoding one or more codewords corresponding to one or more prediction errors associated with the basemesh frame, wherein the one or more prediction errors are associated with the basemesh frame, wherein the one or more prediction errors are associated with a fine category or a coarse category; assigning one or more contexts for decoding the one or more codewords corresponding to the one or more prediction errors; and sharing the one or more contexts to be used for the one or more prediction errors associated with the fine category or the coarse category.

In some embodiments, the one or more the one or more prediction errors includes at least one of a fine geometry prediction error, a coarse geometry prediction error, a fine texture prediction error, or a coarse texture prediction error. The method further includes sharing the one or more contexts to be used between at least one of the fine geometry prediction error, the coarse geometry prediction error, the fine texture prediction error, or the coarse texture prediction error.

In some embodiments, the one or more codewords includes one or more portions, wherein a portion of the one or more portions is associated with a truncated unary binarization, and wherein multiple bin positions within the truncated unary binarization share a same context of the one or more contexts.

In at least one embodiment, there are three contexts of the one or more contexts associated with the portion of the codeword, wherein the three contexts are used for the coarse category, and wherein a subset of the three contexts is used for the fine category.

In some embodiments, there are a first number of bins for the truncated unary binarization associated with a fine texture prediction error and a second number of bins for the truncated unary binarization associated with a coarse texture prediction error, wherein the first number is greater than the second number.

In at least one embodiment, the one or more codewords includes one or more portions, wherein a portion of the one or more portions is associated with an exponential Golomb prefix binarization, and wherein multiple bin positions within the exponential Golomb prefix binarization share a same context of the one or more contexts.

In some examples, there are five contexts of the one or more contexts associated with the portion of the codeword, wherein the five contexts are used for a first prediction error type of the one or more prediction errors, and wherein a subset of the five contexts is used for a second prediction error type of the one or more prediction errors.

In at least some examples, the one or more codewords includes one or more portions, wherein a portion of the one or more portions is associated with an exponential Golomb suffix binarization, and wherein multiple bin positions within the exponential Golomb suffix binarization share a same context of the one or more contexts.

In some embodiments, there are five contexts of the one or more contexts associated with the portion of the codeword, wherein the five contexts are used for a first prediction error type of the one or more prediction errors, and wherein a subset of the five contexts is used for a second prediction error type of the one or more prediction errors.

In at least some embodiments, the one or more prediction errors includes at least one of a fine normal prediction error, a coarse normal prediction error, a fine attribute prediction error, or a coarse attribute prediction error.

An aspect of the present disclosure provides an apparatus for decoding a mesh frame, comprising a processor. In some cases, the processor is configured to cause: receive a bitstream including an arithmetically coded prediction error for a current coordinate of the mesh frame; determine one or more contexts for the arithmetically coded prediction error for the current coordinate; arithmetically decode the arithmetically coded prediction error based on the one or more contexts to determine a prediction error for the current coordinate; determine a prediction value for the current coordinate; and determine a coordinate value of the current coordinate based on the prediction error for the current coordinate and the prediction value for the current coordinate, wherein one or more contexts for a prediction error for at least one coordinate associated with a fine category are shared for a prediction error for at least one coordinate associated with a coarse category.

In at least some embodiments, one or more contexts for a prediction error for at least one geometry coordinate are shared for a prediction error for at least one texture coordinate.

In some examples, one or more contexts for a truncated unary part of the prediction error for at least one coordinate associated with the fine category are shared for a truncated unary part of the prediction error for at least one coordinate associated with the coarse category.

In at least one example, one or more contexts for a prefix part of the prediction error for at least one coordinate associated with the fine category are shared for a prefix part of the prediction error for at least one coordinate associated with the coarse category.

In some embodiments, one or more contexts for a suffix part of the prediction error for at least one coordinate associated with the fine category are shared for a suffix part of a prediction error for at least one coordinate associated with the coarse category.

An aspect of the present disclosure provides an apparatus for encoding a mesh frame, comprising a processor. The processor is configured to cause: determine a prediction value for a current coordinate of the mesh frame; determine a prediction error for the current coordinate based on a value of the current coordinate and the prediction value for the current coordinate; determine one or more contexts for the prediction error for the current coordinate; arithmetically encode the prediction error for the current coordinate based on the one or more contexts to generate arithmetically coded prediction error for the current coordinate; and transmit a bitstream including the arithmetically coded prediction error, wherein one or more contexts for a prediction error for at least one coordinate associated with a fine category are shared for a prediction error for at least one coordinate associated with a coarse category.

In at least one embodiment, one or more contexts for a prediction error for at least one geometry coordinate are shared for a prediction error for at least one texture coordinate.

In some examples, one or more contexts for a truncated unary part of the prediction error for at least one coordinate associated with the fine category are shared for a truncated unary part of the prediction error for at least one coordinate associated with the coarse category.

In some cases, one or more contexts for a prefix part of the prediction error for at least one coordinate associated with the fine category are shared for a prefix part of the prediction error for at least one coordinate associated with the coarse category.

In at least one embodiment, one or more contexts for a suffix part of the prediction error for at least one coordinate associated with the fine category are shared for a suffix part of the prediction error for at least one coordinate associated with the coarse category.

BRIEF DESCRIPTION OF THE DRAWINGS

FIGS. 10A, 10B, 11A, 11B, 12A, 12B, 12C, 12D, 13A, 13B, 13C, 13D, 14A, 14B, 15A, 15B, 16A, 16B, 16C, 16D, 17A, 17B, 17C, 17D, 18A, 18B, 18C, and 18D illustrate example simplified prediction error contexts in accordance with an embodiment.

Figure 1:
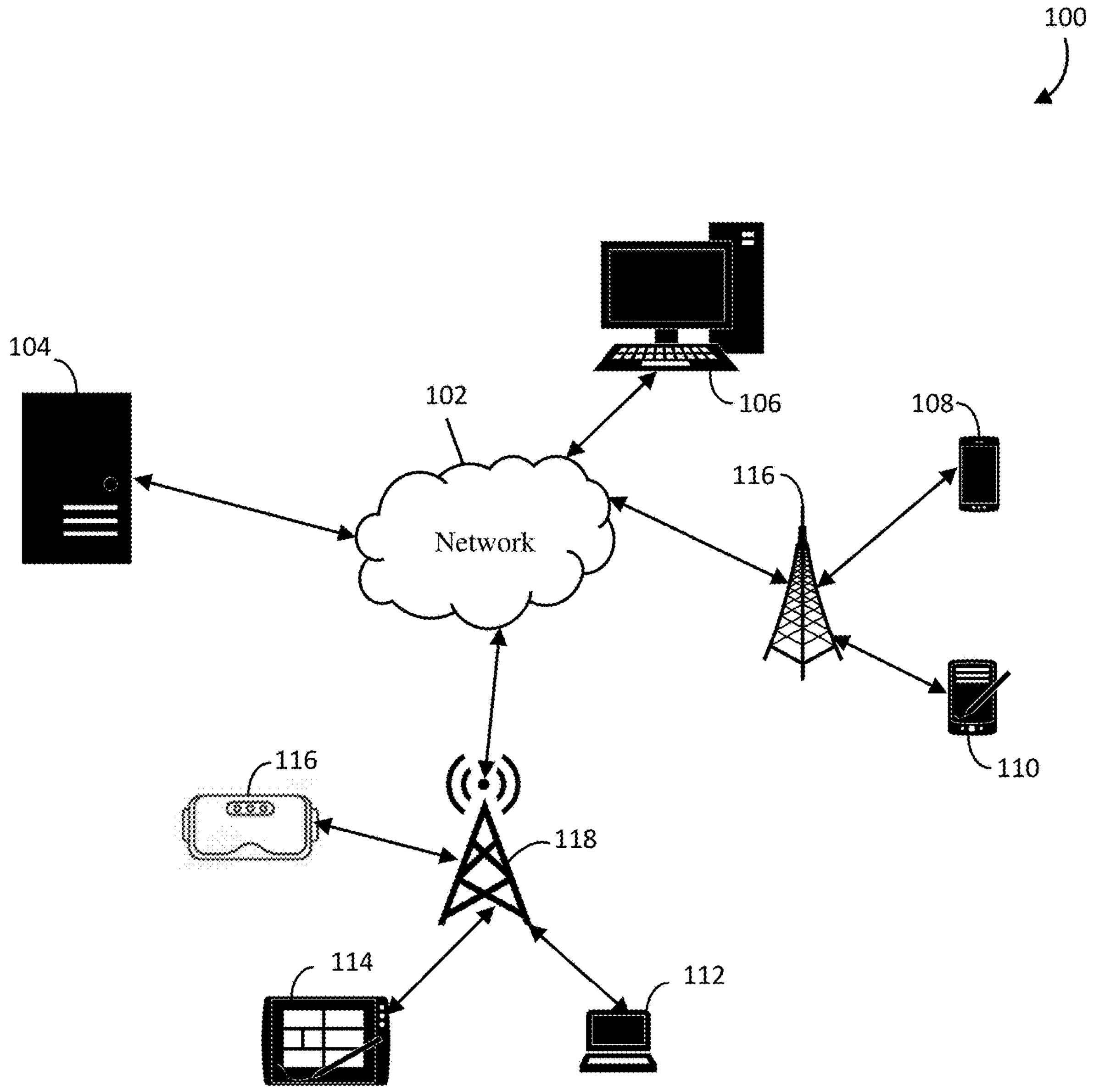
FIG. 1 illustrates an example communication system 100 in accordance with an embodiment of this disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

In some embodiments, three hundred sixty degree (360°) video and three-dimensional (3D) volumetric video are emerging as new ways of experiencing immersive content due to the ready availability of powerful handheld devices such as smartphones. In some embodiments, while 360° video enables immersive "real life," "being there" experience for consumers by capturing the 360° outside-in view of the world, 3D volumetric video can provide a complete "six degrees of freedom" (6DoF) experience of being and moving within the content. In some examples, users can interactively change their viewpoint and dynamically view any part of the captured scene or object they desire. Display and navigation sensors can track head movement of the user in real-time to determine the region of the 360° video or volumetric content that the user wants to view or interact with. Multimedia data that is three-dimensional (3D) in nature, such as point clouds or 3D polygonal meshes, can be used in the immersive environment.

In an embodiment, a point cloud is a set of 3D points along with attributes such as color, normal, reflectivity, point-size, etc. that represent an object's surface or volume. In some examples, point clouds are common in a variety of applications such as gaming, 3D maps, visualizations, medical applications, augmented reality, virtual reality, autonomous driving, multi-view replay, 6DoF immersive media, to name a few. In at least some examples, uncompressed point clouds generally require a large amount of bandwidth for transmission. Accordingly, due to the large bitrate requirement, point clouds are often compressed prior to transmission. In at least one example, compressing a 3D object such as a point cloud, often requires specialized hardware. To avoid specialized hardware to compress a 3D point cloud, a 3D point cloud can be transformed into traditional two-dimensional (2D) frames and that can be compressed and later be reconstructed and viewable to a user.

In an embodiment, Polygonal 3D meshes, especially triangular meshes, are another popular format for representing 3D objects. Meshes typically include a set of vertices, edges and faces that are used for representing the surface of 3D objects. Triangular meshes are simple polygonal meshes in which the faces are simple triangles covering the surface of the 3D object. In some examples, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second.

Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

In an embodiment, communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a head mounted display (HMD) device, or the like. In some examples, server 104 can represent one or more servers. Each server 104 includes any suitable computing or processing device that can provide computing services for one or more client devices, such as the client devices 106-116.

Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include, but are not limited to, a desktop computer 106, a mobile telephone or mobile device 108 (such as a smartphone), a personal digital assistance (PDA) 110, a laptop computer 112, a tablet computer 114 (e.g., with a touchscreen or stylus), and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In an embodiment, HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations (e.g., BS) 118, such as cellular base stations or eNodeBs (eNBs) or a fifth generation (5G) base station implementing new radio (NR) technology or gNodeB (gNb). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a virtual reality (VR) display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
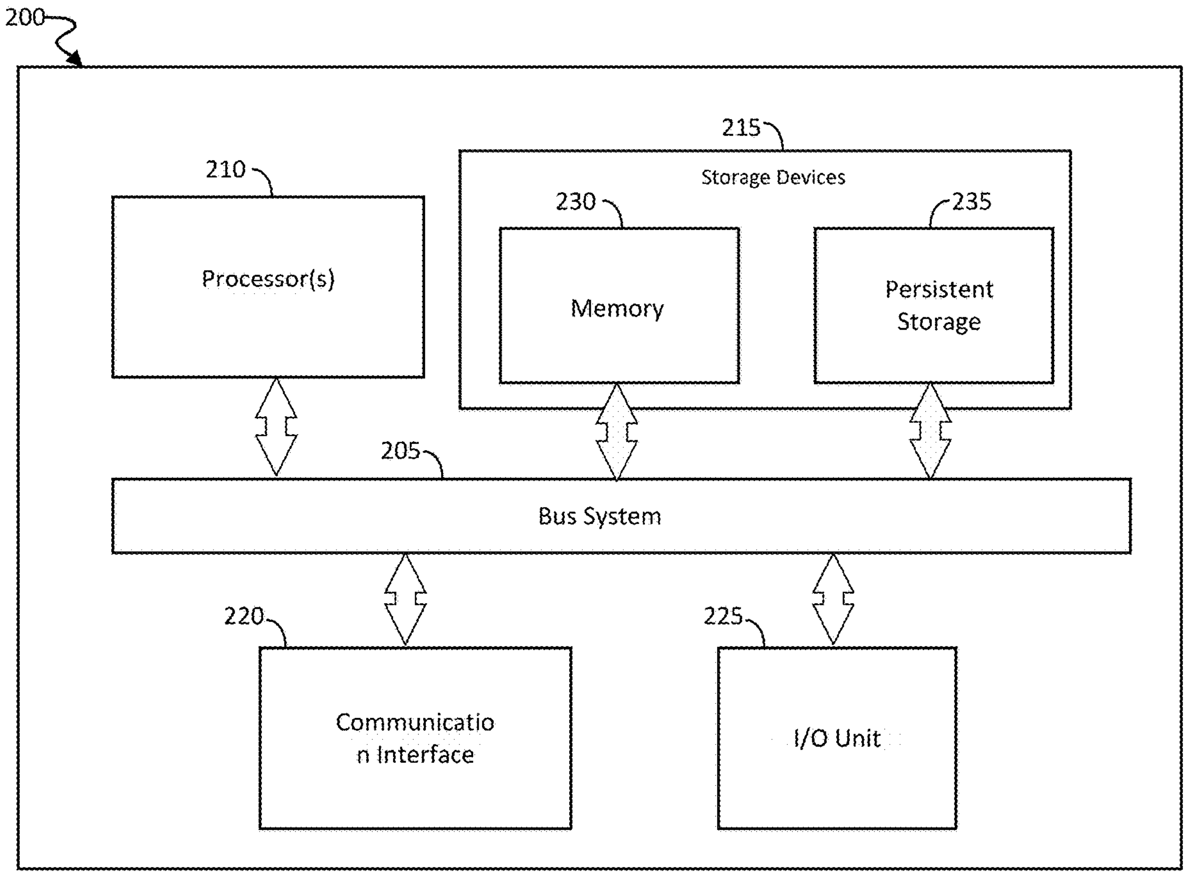
FIGS. 2 and 3 illustrate example electronic devices in accordance with an embodiment of this disclosure.
Figure 3:
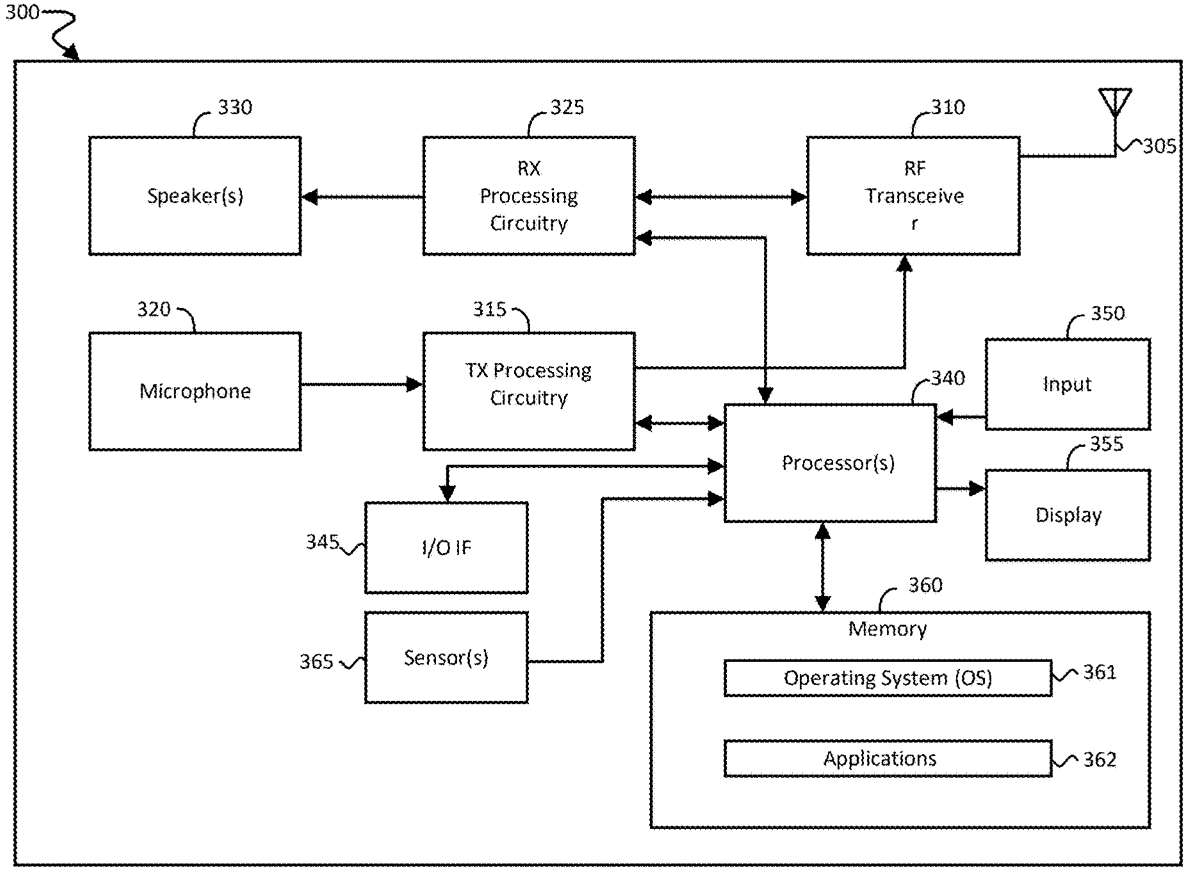

FIGS. 2 and 3 illustrate example electronic devices in accordance with an embodiment of this disclosure. In particular, FIG. 2 illustrates an example server 200, and the server 200 could represent the server 104 as described with reference to FIG. 1. In an embodiment, the server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

In an embodiment, the RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or augmented reality (AR) application (e.g., a device from the field of Extended Reality (XR)), a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a random access memory (RAM), and another part of the memory 360 could include a Flash memory or other read only memory (ROM). The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Additionally, the ISO/IEC SC29/WG07 is currently working on developing a standard for video-based compression of dynamic meshes. In an embodiment, an eighth test model, V-DMC Test Model for Mesh (TMM) 8.0 represents a current state of the standard, established on June 2024 at the $14^{th}$ meeting of the ISO/IEC SC29/WG07. In at least one embodiment, a software implementation of V-DMC TTM 8.0 is available in a form of software from a git repository. In some embodiments, a committee draft (CD) specification for video-based compression of dynamic meshes is also available.

The following documents are hereby incorporated by reference into the present disclosure as if fully set forth herein: i) V-DMC TMM 8.0, ISO/IEC SC29 WG07 N00874, June 2024; ii) CD of V-DMC, ISO/IEC SC29 WG07 N00885, June 2024; iii) CD of V-DMC, ISO/IEC SC29 WG07 N01027, December 2024; and iv) V-DMC 8.0, ISO/IEC SC29 WG07 N01099, February 2025.

Figure 4:
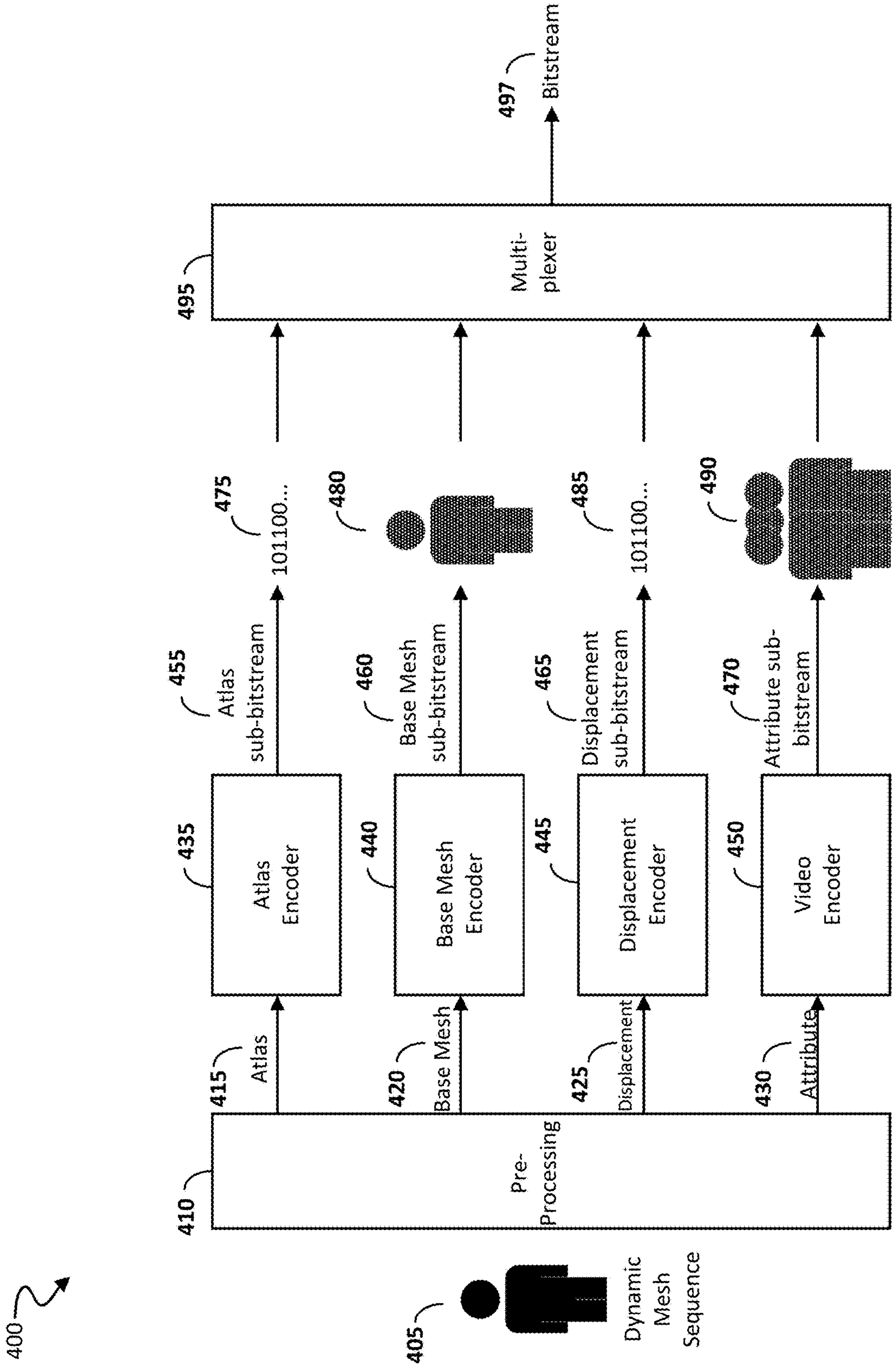
FIG. 4 illustrates a block diagram for an encoder encoding intra frames in accordance with an embodiment.
Figure 5:
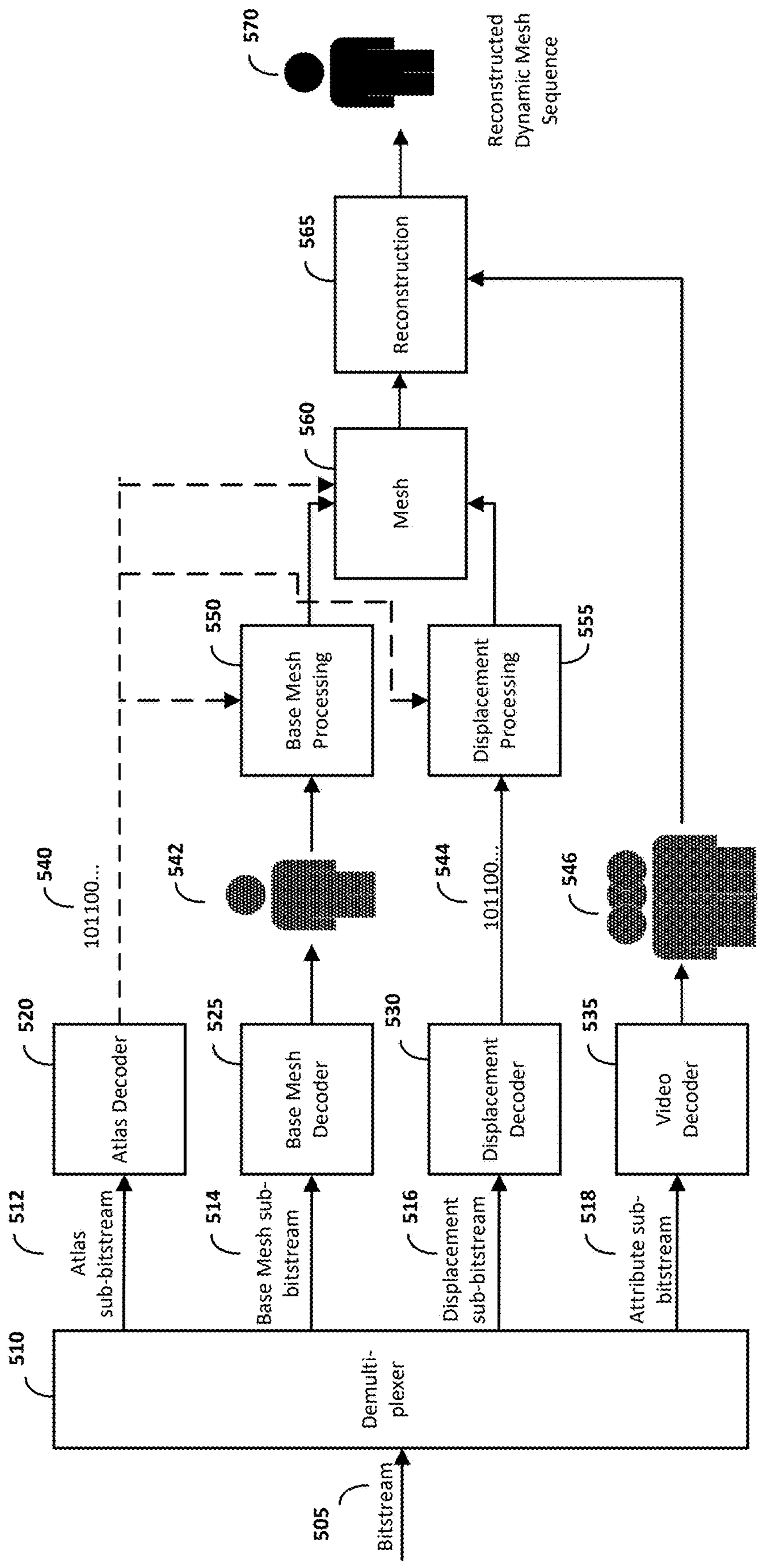
FIG. 5 illustrates a block diagram for a decoder in accordance with an embodiment.

FIGS. 4 and 5 illustrate block diagrams for a V-DMC encoder and decoder, respectively.

As shown in FIG. 4, system 400 can include pre-processing unit 410 in communication with one or more encoders (e.g., in communication with an atlas encoder 435, a basemesh encoder 440, a displacement encoder 445, and a video encoder 450). In one embodiment, system 400 illustrates an encoding of a dynamic mesh sequence 405 being multiplexed and transmitted as a visual volumetric video-based encoding (V3C) bitstream 497. In an embodiment, for each mesh frame, the system 400 can create a basemesh 420, which can include a lesser number of vertices compared to an original mesh. In one embodiment, the basemesh is compressed either in a lossy or lossless manner to create a basemesh sub-bitstream 460. In one embodiment, the basemesh 420 is intra coded—e.g., coded without prediction from neighboring basemesh frames. In other embodiments, the baes-mesh 420 is inter coded—e.g., coded with predictions from neighboring basemesh frames. In one embodiment, a reconstructed basemesh undergoes subdivision and then a displacement field between the original mesh and the subdivided reconstructed basemesh is calculated, compressed, and transmitted.

For example, the pre-processing unit 410 can receive a dynamic mesh sequence 405. In at least one embodiment, the pre-processing unit 410 can convert the dynamic mesh sequence 405 into components: atlas 415, basemesh 420, displacement 425, and attributes 430. That is, the dynamic mesh sequence 405 can include information about connectivity, geometry, mapping, vertex attributes, and attribute maps. In some embodiments, connectivity information refers to connections between vertexes of the dynamic mesh sequence 405. In some examples, geometric information refers to a position of each vertex in a 3D space, represented as coordinates. In some examples, attribute 430 information includes information about color, material information, normal direction, texture coordinates, etc., of the vertexes or a mesh face. In at least one embodiment, the dynamic mesh sequence 405 can be referred to as dynamic if one or more of the connectivity, geometry, mapping, vertex attribute, and/or attribute maps change.

In at least one embodiment, the pre-processing unit 410 can receive the dynamic mesh sequence 405 and transmit various portions of the dynamic mesh sequence to a plurality of encoders. For example, the dynamic mesh sequence 405 can include an atlas 415 portion that is pre-processed and transmitted to the atlas encoder 435. In one embodiment, the atlas 415 refers to a collection of two-dimensional (2D) bounding boxes and their associated information placed onto a rectangular frame and corresponding to a volume in a three-dimensional (3D) space on which volumetric data is rendered and a list of metadata corresponding to a part of a surface of a mesh in 3D space. In some embodiments, the atlas 415 can include information about geometry (e.g., depth) or texture (e.g., texture atlases). In at least one embodiment, the system 400 can utilize the metadata of atlas 415 to generate the bitstream 497. For example, the atlas 415 component provides information on how to perform inverse reconstruction—e.g., the atlas 415 can describe how to perform the subdivision of basemesh 420, how to apply displacement 425 vectors to the subdivided mesh, or how to apply the attributes 430 to the reconstructed mesh.

In at least one embodiment, the basemesh 420 can be referred to as a simplified low-resolution approximation of the original mesh, encoded using any mesh codec.

In at least one embodiment, the displacement 425 information provides displacement vectors that can be encoded as VC3 geometry video components using any video codec.

In some embodiments, attributes 430 provide additional properties and can be encoded by any video codec.

In an embodiment, the pre-processing unit 410 can create a basemesh 420 from the dynamic mesh sequence 405. In one embodiment, the pre-processing unit 410 can convert an original mesh into the basemesh based on a series of displacements 425 according to an attribute 430 map. For example, the original dynamic mesh sequence 405 can be down sampled to reduce a number of vertexes—e.g., to create a decimated mesh. In at least one embodiment, the decimated mesh undergoes re-parameterization through an application of the atlas 415 information and the atlas encoder 435 to generate the basemesh 420. In at least one embodiment, a subdivision is then applied to the basemesh 420 based in part on the displacement 425 information.

In at least one embodiment, the atlas encoder 435 generates an atlas sub-bitstream 455, a basemesh encoder 440 generates a basemesh sub-bitstream 460 and video encoder 450 generates attribute sub-bitstream 470. In at least one embodiment, the sub-bitstreams are multiplexed at multiplexer 495 to generate and transmit the bitstream 497.

FIG. 5 illustrates a block diagram for a decoder in accordance with an embodiment.

As shown in FIG. 5, system 500 can include a demultiplexer 510 in communication with one or more decoders (e.g., in communication with an atlas decoder 520, a basemesh decoder 525, a displacement decoder 530, and a video decoder 535). In one embodiment, system 500 illustrates a decoding of a visual volumetric video-based encoding (V3C) bitstream 505 into a reconstructed dynamic mesh sequence 570. In an embodiment, the system 500 decodes the basemesh sub-bitstream 514 to form a reconstructed basemesh 542. In some embodiments, the reconstructed basemesh 542 undergoes subdivision in the decoder. In at least one embodiment, a received displacement field is decompressed and added to the reconstructed basemesh to generate a final reconstructed mesh in the decoder.

For example, the demultiplexer 510 can receive a bitstream 505 and determine an atlas sub-bitstream 512, a basemesh sub-bitstream 514, a displacement sub-bitstream 516, and an attribute sub-bitstream 518. In at least one embodiment, an atlas decoder 520 processes the atlas sub-bitstream 512 information and transmits the encoded information to the basemesh processing 550. In some embodiments, the basemesh decoder 525 decodes the basemesh sub-bitstream 514 information to generate the reconstructed basemesh 542. In at least one embodiment, the displacement decoder 530 can decompress the displacement sub-bitstream 516 information and transmit the decoded bits 544 to a displacement processing unit 555. In at least one embodiment, system 500 reconstructs the mesh 560 by processing the basemesh 542, the decompressed atlas sub-bitstream 512 information and using the output of the processing and the displacement information generated by displacement processing 555 to generate the reconstructed mesh 565. In at least one embodiment, video decoder 535 can decompress the attribute sub-bitstream 518 information and transmit the information to the reconstruction unit 565. In at least one embodiment, the reconstruction unit 565 can generate the reconstructed dynamic mesh sequence 570 based on the reconstructed mesh 560 and the attribute information 546.

Figure 6:
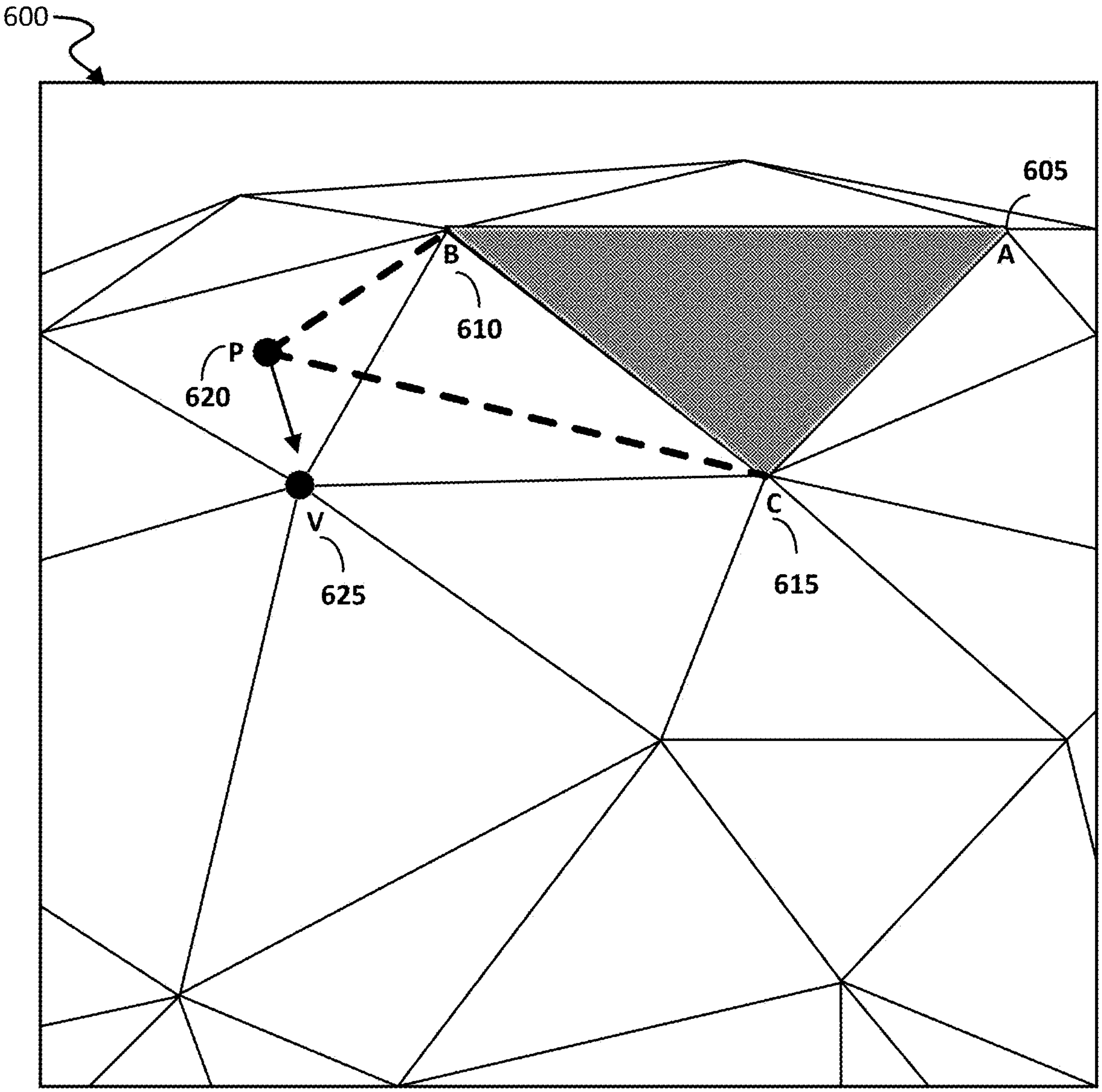
FIGS. 6 and 7 illustrate a block diagram of parallelogram mesh predictions in accordance with an embodiment.
Figure 7:
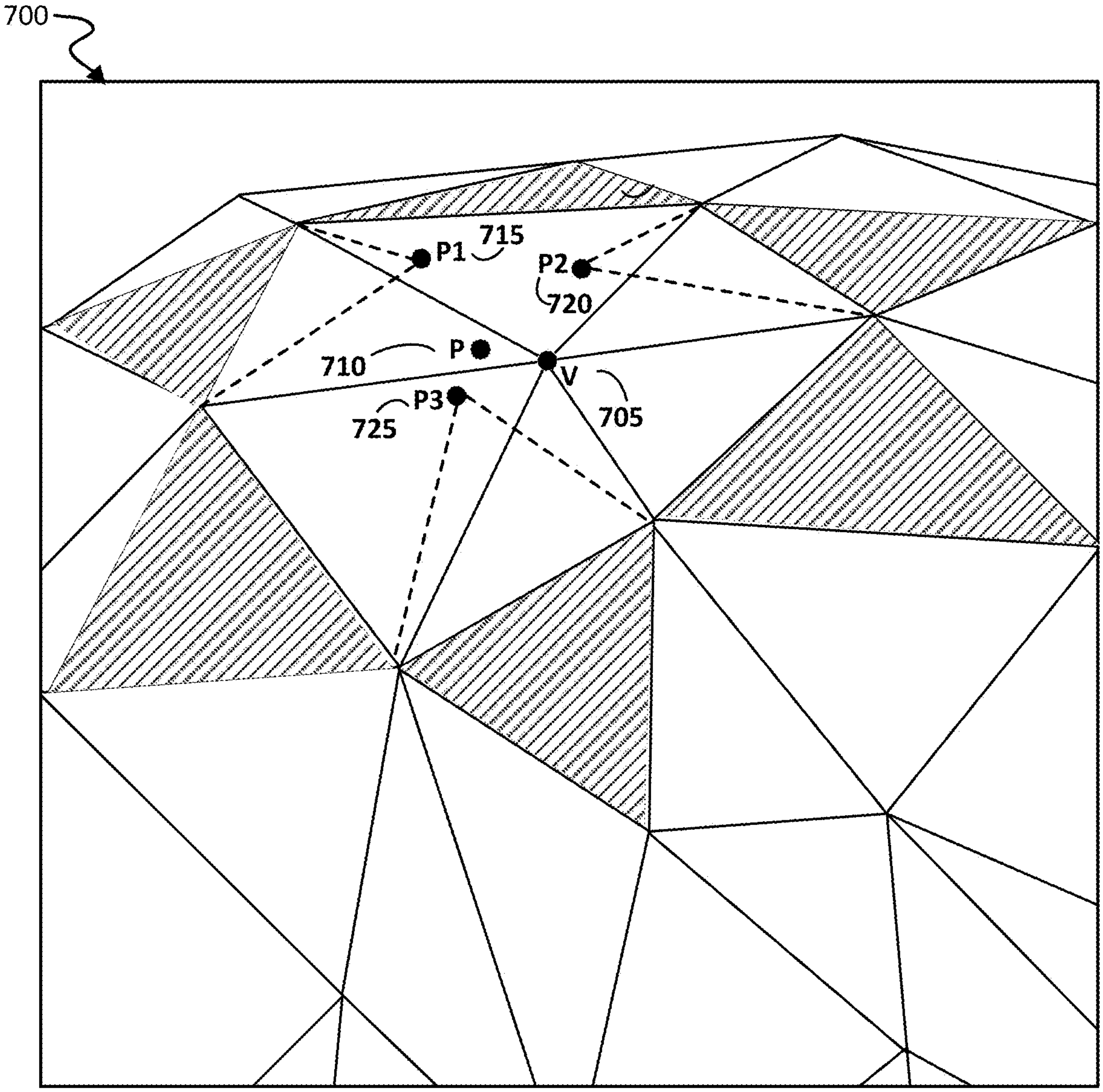

In at least one embodiment, FIGS. 6 and 7 illustrate example parallelogram mesh predictions. In at least one embodiment FIGS. 6 and 7 illustrate a basemesh that is intra coded—e.g., coded with predictions from neighboring vertices in the same basemesh frames. For example, as shown in FIG. 6, a vertex position is predicted based off a position of available neighboring vertices. In one embodiment, a vertex "V" 625 is predicted. In such examples, a predictor "P" 620 of "V" 625 is calculated from available neighboring vertices, vertex 605 "A", vertex 610 "B", and vertex 615 "C." In one embodiment, available neighboring vertices can refer to vertices already transmitted. For example, a triangle (e.g., the shaded region) composed of vertex 605 "A", vertex 610 "B", and vertex 615 "C" may already be transmitted at a time a prediction for predictor "P" 620 is made.

In one embodiment, a parallelogram prediction algorithm is used. In other embodiments, a different predictor can be used, e.g., average value of available vertices, previous vertex, left vertex, right vertex, etc. In one embodiment where parallelogram prediction is used, the predictor "P" 620 is determined from the following equation (equation 1):

$$P = B + C - A$$

In at least one embodiment, a geometry prediction error "D" is determined by taking a difference between vertex "V" 625 and the predictor "P" 620 as shown in the following equation (equation 2):

$$D = V - P$$

In some embodiments, the prediction error is calculated and transmitted. In at least one embodiment, each vertex is represented by a three-dimensional coordinate (e.g., in X, Y, Z geometric coordinates).

In some embodiments, multiple parallelograms can be predicted, as illustrated in FIG. 7. For example, predictor "P1" 715, predictor "P2" 720, predictor "P3" 725 are calculated from vertices of three neighboring triangles (e.g., already transmitted triangles shown as the shaded regions in FIG. 7) using parallelogram prediction. In at least one embodiment, a final predictor "P" 710 is calculated as an average of predictor "P1" 715, predictor "P2" 720, and predictor "P3" 725. In at least one embodiment, a geometric error associated with the parallelogram prediction shown in FIG. 7 is determined by equation 2 shown above. In at least one embodiment, determining the prediction error occurs at the basemesh encoder 440 as described with reference to FIG. 4 or the basemesh decoder 525 as described with reference to FIG. 5.

Figure 8A:
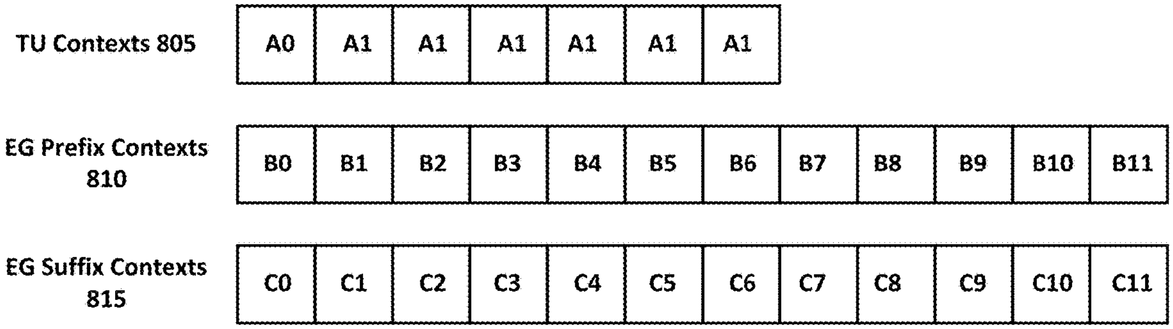
FIGS. 8A, 8B, 9A, and 9B illustrate example prediction error contexts in accordance with an embodiment.
Figure 8B:
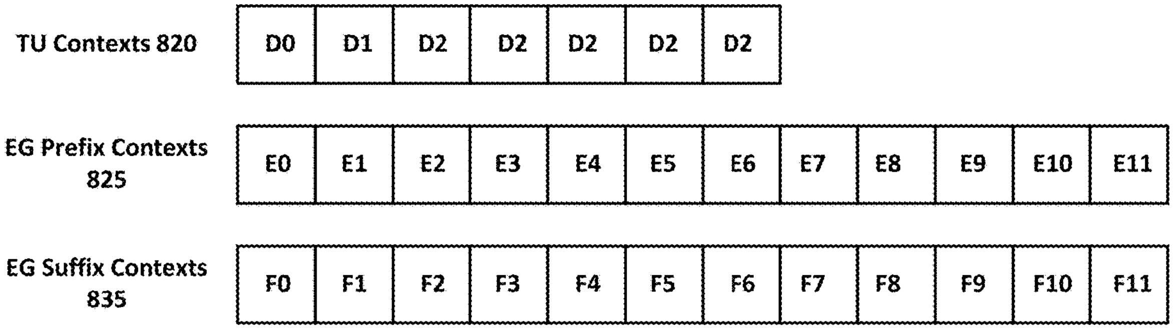

FIGS. 8A and 8B illustrate contexts for a binary arithmetic coding scheme for geometry prediction error in video-based dynamic mesh coding (V-DMC).

As described with reference to FIGS. 6 and 7, a prediction error can be calculated and transmitted based on generating the basemesh. In at least some embodiments, the prediction errors are encoded (e.g., at an entropy coder or arithmetic encoder) and then transmitted. In at least some embodiments, the prediction error value is converted into a positive number determined prior to the encoding—e.g., a non-positive integer (e.g., x≤0) is mapped to an odd integer −2x+1, while a positive integer x>0 is mapped to an even integer 2x as referenced in Table I.1 in the V-DMC TMM 8.0. In at least one embodiment, the prediction error is coded using an arithmetic coding scheme to generate a prediction error codeword that is transmitted. In at least one embodiment, the prediction error codeword can be made up of a combination of truncated unary (TU) code and exp-golomb (EG) code. That is, the prediction error codeword can include a first portion associated with the TU code, a second portion associated with a prefix of the EG code, and a third portion associated with a suffix of the EG code. In some embodiments, the binary arithmetic coding uses different contexts to code different bins of a TU+EG codeword. In some embodiments, binarization of the information enables context modeling to be applied to each bin (e.g., each bit position). In some embodiments, a context model is a probability model for one or more bins of the TU+EG codeword—e.g., the context model stores the probability of each bin being a ‘1’ or a ‘0’.

In some embodiments, there can be multiple different types of prediction errors. For example, there can be a geometry prediction error as described with reference to FIGS. 6 and 7. In one example, in V-DMC TMM 7.0, the geometric prediction error is classified into two categories, “fine” and “coarse.” In one embodiment, a “fine” category refers to vertices that are a part of at least one parallelogram, which all three remaining vertices being available (e.g., already transmitted). In some embodiments, a “coarse” category refers to remaining vertices (e.g., with one or two available vertex neighbors, or on a boundary, etc.). In at least one embodiment, no explicit symbol is associated with either category (e.g., with either “fine” or “coarse”). In such embodiments, a category can be inferred from neighborhood information (e.g., whether the remaining vertices are available or not).

In one embodiment, FIG. 8A illustrates contexts for a “fine” category and FIG. 8B illustrates contexts for a “coarse” category for a geometric prediction error.

As illustrated in FIG. 8A, for a “fine” category of the geometric prediction error, there can be a maximum of seven (7) bins that use two contexts (e.g., A0 or A1) for the TU contexts 805. In some embodiments, the EG prefix contexts 810 portion of the codeword uses a maximum of twelve (12) bins that use twelve (12) contexts (e.g., B0-B11). In at least one embodiment, the EG suffix contexts 815 portion of the codeword use a maximum of twelve (12) bins that use twelve (12) contexts (e.g., C0-C11). That is, the prediction error codeword can have a variable length and the actual codeword can use a subset of the TU contexts 805, EG prefix contexts 810, and the EG suffix contexts 815. In some embodiments, a maximum number of bins for the TU contexts 805, the EG prefix contexts 810, and the EG suffix contexts 815 is different than seven (7) or twelve (12), respectively. That is, the maximum number of bins can be any number greater than zero e.g., the maximum number of bins can be 1, 2, 3, 4, 5, 6, 7, etc.

As illustrated in FIG. 8B, for a “coarse” category of the geometric prediction error, there can be a maximum of seven (7) bins that use three contexts (e.g., D0, D1, or D2) for the TU contexts 820. In some embodiments, the EG prefix contexts 825 portion of the codeword uses twelve (12) bins that use twelve (12) contexts (e.g., E0-E11). In at least one embodiment, the EG suffix contexts 835 portion of the codeword use twelve (12) bins that use twelve (12) contexts (e.g., F0-F11). In at least one embodiment, a maximum number of bins for the TU contexts 820, the EG prefix contexts 825, and the EG suffix contexts 835 is different than seven (7) or twelve (12), respectively. That is, the maximum number of bins can be any number greater than zero—e.g., the maximum number of bins can be 1, 2, 3, 4, 5, 6, 7, etc.

Figure 9A:
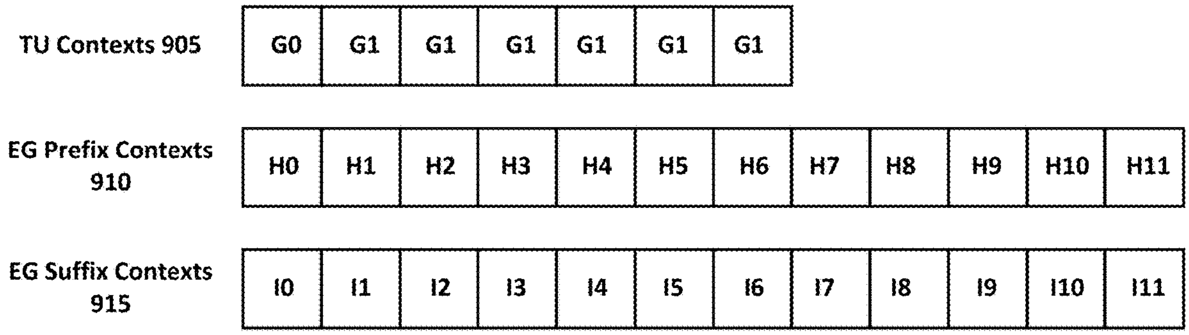
Figure 9B:
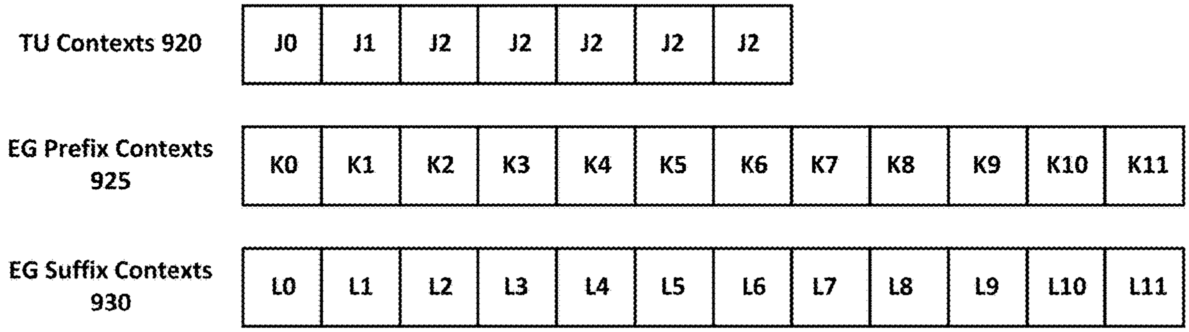

FIGS. 9A and 9B illustrates contexts for a binary arithmetic coding scheme for texture coordinates prediction error in video-based dynamic mesh coding (V-DMC).

As described with reference to FIGS. 8A and 8B, there can be multiple different types of prediction errors. As one example, in V-DMC, material properties (e.g., texture coordinates) are transmitted for each vertex (e.g., each vertex as described with reference to FIGS. 6 & 7). In some embodiments, a texture coordinate maps the vertex to a two-dimensional (2D) position in a texture image, which is then used for texture mapping while rendering three-dimensional (3D) objects. In at least one embodiment, the two-dimensional position in the texture image is typically represented by (U,V) coordinates. In some embodiments, the texture coordinates are predicted from texture coordinates and geometry coordinates of available neighboring vertices. In one example, a prediction error (e.g., an actual texture coordinate (T) minus the predicted texture coordinate (M), Texture Prediction Error=T−M) is determined and transmitted. In at least one embodiment, the texture prediction error is classified into a “fine” category and a “coarse” category—e.g., a “fine” category refers to vertices that are a part of at least one parallelogram, which all three remaining vertices being available (e.g., already transmitted) and a “coarse” category refers to remaining vertices (e.g., with one or two available vertex neighbors, or on a boundary, etc.). In at least one embodiment, no explicit symbol is associated with either category (e.g., with either “fine” or “coarse”). In such embodiments, a category can be inferred from neighborhood information (e.g., whether the remaining vertices are available or not).

In at least one embodiment, a prediction error value of a texture coordinate prediction error is converted into a positive number determined prior to the encoding. For example, a non-positive integer (e.g., x≤0) is mapped to an odd integer −2x+1, while a positive integer x>0 is mapped to an even integer 2x as referenced in Table I.1 in the V-DMC TMM 8.0. In at least one embodiment, the texture coordinate prediction error is coded using a binary arithmetic coding scheme—e.g., that is the prediction error for the texture coordinate prediction error has a format similar to the format described of the geometry prediction error with reference to FIGS. 8A and 8B. For example, the texture coordinate prediction error can utilize a combination of truncated unary (TU) code and exp-golomb (EG) code. That is, the texture coordinate prediction error codeword can include a first portion associated with the TU code, a second portion associated with a prefix of the EG code, and a third portion associated with a suffix of the EG code. In some embodiments, the binary arithmetic coding uses different contexts to code different bins of a TU+EG codeword. In some embodiments, binarization of the information enables context modeling to be applied to each bin (e.g., each bit position). In some embodiments, a context model is a probability model for one or more bins of the TU+EG codeword—e.g., the context model stores the probability of each bin being a '1' or a '0'. In at least one embodiment, a context (e.g., a context model) is chosen based on a value of neighboring triangles illustrated with reference to FIG. 7.

In one embodiment, FIG. 9A illustrates contexts for a "fine" category and FIG. 9B illustrates contexts for a "coarse" category for texture coordinate prediction error.

As illustrated in FIG. 9A, for a "fine" category of the texture coordinates prediction error, there can be a maximum of seven (7) bins that use two contexts (e.g., G0 or G1) for the TU contexts 905. In some embodiments, the EG prefix contexts 910 portion of the codeword uses a maximum of twelve (12) bins that use twelve (12) contexts (e.g., H0-H11). In at least one embodiment, the EG suffix contexts 915 portion of the codeword uses a maximum of twelve (12) bins that use twelve (12) contexts (e.g., I0-I11). In some embodiments, a maximum number of bins for the TU contexts 905, the EG prefix contexts 910, and the EG suffix contexts 915 can be different than seven (7) and twelve (12), respectively. For example, the maximum number of bins can be any number greater than zero—e.g., 1, 2, 3, 4, 5, 6, etc.

As illustrated in FIG. 9B, for a "coarse" category of the texture coordinates prediction error, there can be a maximum of seven (7) bins that use three contexts (e.g., J0, J1, or J2) for the TU contexts 920. In some embodiments, the EG prefix contexts 925 portion of the codeword uses a maximum of twelve (12) bins that use twelve (12) contexts (e.g., K0-K11). In at least one embodiment, the EG suffix contexts 930 portion of the codeword uses a maximum of twelve (12) bins that use twelve (12) contexts (e.g., L0-L11). In some embodiments, a maximum number of bins for the TU contexts 920, the EG prefix contexts 925, and the EG suffix contexts 930 can be different than seven (7) and twelve (12), respectively. For example, the maximum number of bins can be any number greater than zero—e.g., 1, 2, 3, 4, 5, 6, etc.

Figure 10A:
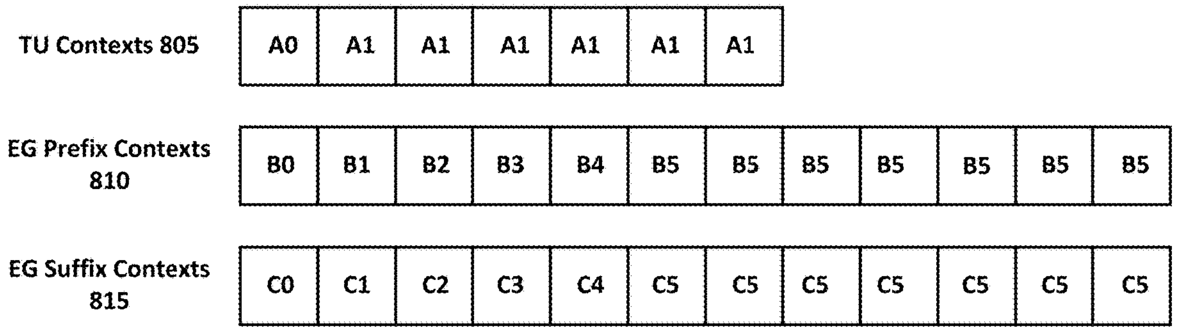
Figure 10B:
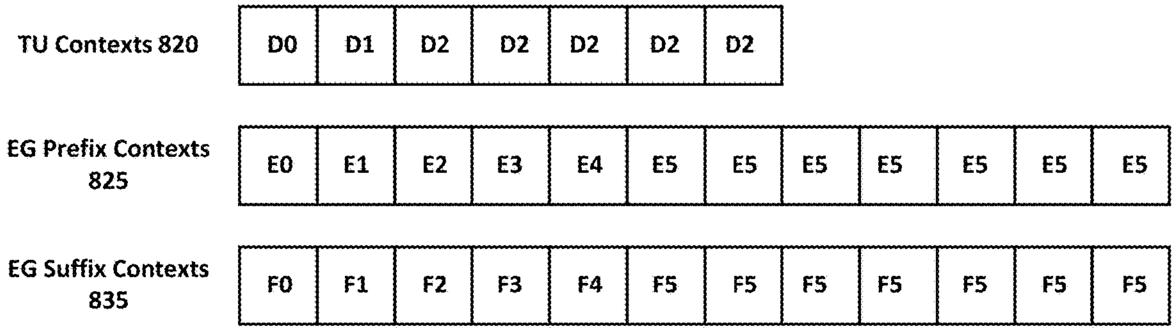
Figure 11A:
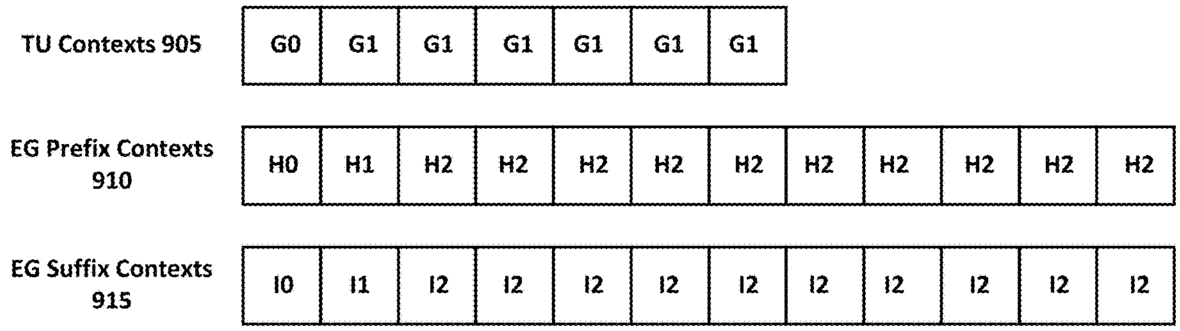
Figure 11B:
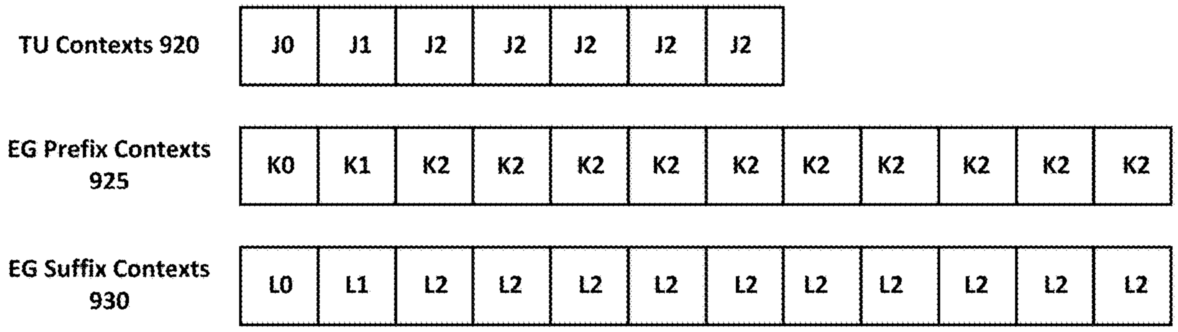

FIGS. 10A, 10B, 11A, and 11B illustrate a simplified context scheme for a binary arithmetic coding scheme for geometry prediction error in video-based dynamic mesh coding (V-DMC), in accordance with an embodiment described herein. In one embodiment, FIGS. 10A and 11A illustrates simplified contexts for a "fine" category and FIGS. 10B and 11B illustrate simplified contexts for a "coarse" category for a geometric prediction error and a texture coordinate prediction error, respectively. In an embodiment, FIGS. 10 and 11 represent embodiments for sharing contexts for a respective TU context, EG prefix context, or EG suffix context.

For example, in V-DMC TMM 7.0, as illustrated in FIGS. 8A, 8B, 9A and 9B, a total of 106 contexts are used for geometry prediction error and texture coordinates prediction error. However, as described herein (e.g., with reference to FIGS. 10A, 10B, 11A and 11B), a reduced number of contexts is used. For example, 58 total contexts are shown with reference to FIGS. 10A, 10B, 11A and 11B. In at least one embodiment, additional context models cause an issue of context dilution. In at least one embodiment, context dilution occurs when there a large number of contexts with insufficient data available to suggest accurate models for all contexts. Accordingly, using the simplified context model of FIGS. 10A, 10B, 11A and 11B reduces the possibility of context dilution, lower context memory requirements (e.g., less contexts are stored in the memory), and can reduce an overall complexity of the system. In at least one embodiment, there can also be a bit savings since contexts for higher order bins are trained better.

For example, as illustrated in FIG. 10A, for a "fine" category of the geometric prediction error, there can be a maximum of seven (7) bins that use two contexts (e.g., A0 or A1) for the TU contexts 805. In some embodiments, the EG prefix contexts 810 portion of the codeword uses twelve (12) bins that use six (6) contexts (e.g., B0-B5). In such embodiments, bins 0-5 have their own context (e.g., B0-B5) and bin 6 onward (e.g., bins 6-11) reuse the context of bin 5 (e.g., B5). That is, contexts B6-B11 as described with reference to FIGS. 8A and 8B are not used. In at least one embodiment, the EG suffix contexts 815 portion of the codeword use twelve (12) bins that use six (6) contexts (e.g., C0-C5). In such embodiments, bins 0-5 have their own context (e.g., C0-C5) and bin 6 onward (e.g., bins 6-11) reuse the context of bin 5 (e.g., C5). That is, contexts C5-C11 are not used. In at least one embodiment, a maximum number of bins for the TU contexts 805, the EG prefix contexts 810, and the EG suffix contexts 815 can be different than seven (7) and twelve (12), respectively. For example, the maximum number of bins can be any number greater than zero—e.g., 1, 2, 3, 4, 5, 6, etc.

As illustrated in FIG. 10B, for a "coarse" category of the geometric prediction error, there can be a maximum of seven (7) bins that use three contexts (e.g., D0, D1, or D2) for the TU contexts 820. In some embodiments, the EG prefix contexts 825 portion of the codeword uses twelve (12) bins that use six (6) contexts (e.g., E0-E5). In such embodiments, bins 0-5 have their own context (e.g., E0-E5) and bin 6 onward (e.g., bins 6-11) reuse the context of bin 5 (e.g., E5). In at least one embodiment, the EG suffix contexts 835 portion of the codeword use twelve (12) bins that use six (6) contexts (e.g., F0-F5). In such embodiments, bins 0-5 have their own context (e.g., F0-F5) and bin 6 onward (e.g., bins 6-11) reuse the context of bin 5 (e.g., F5). In at least one embodiment, a maximum number of bins for the TU contexts 820, the EG prefix contexts 825, and the EG suffix contexts 835 can be different than seven (7) and twelve (12), respectively. For example, the maximum number of bins can be any number greater than zero—e.g., 1, 2, 3, 4, 5, 6, etc.

For example, as illustrated in FIG. 11A, for a "fine" category of the texture coordinates prediction error, there can be a maximum of seven (7) bins that use two contexts (e.g., G0 or G1) for the TU contexts 905. In some embodiments, the EG prefix contexts 910 portion of the codeword uses twelve (12) bins that use three (3) contexts (e.g., H0-H2). In such embodiments, bins 0-2 have their own context (e.g. H0, H1, H2) and bin 3 onwards (e.g., bins 3-11) reuse the context of bin 2 (e.g., H2). In at least one embodiment, the EG suffix contexts 915 portion of the codeword use twelve (12) bins that use three (3) contexts (e.g., I0-I2). In such embodiments, bins 0-2 have their own context (e.g. I0, I1, I2) and bin 3 onwards (e.g., bins 3-11) reuse the context of bin 2 (e.g., 12). In at least one embodiment, a maximum number of bins for the TU contexts 905, the EG prefix contexts 910, and the EG suffix contexts 915 can be different than seven (7) and twelve (12), respectively. For example, the maximum number of bins can be any number greater than zero—e.g., 1, 2, 3, 4, 5, 6, etc.

As illustrated in FIG. 11B, for a "coarse" category of the texture coordinates prediction error, there can be a maximum of seven (7) bins that use three contexts (e.g., J0, J1, or J2) for the TU contexts 920. In some embodiments, the EG prefix contexts 925 portion of the codeword uses twelve

(12) bins that use three (3) contexts (e.g., K0-K2). In such embodiments, bins 0-2 have their own context (e.g. K0, K1, K2) and bin 3 onwards (e.g., bins 3-11) reuse the context of bin 2 (e.g., K2). In at least one embodiment, the EG suffix contexts 930 portion of the codeword use twelve (12) bins that use three (3) contexts (e.g., L0-L2). In such embodiments, bins 0-2 have their own context (e.g. L0, L1, L2) and bin 3 onwards (e.g., bins 3-11) reuse the context of bin 2 (e.g., L2). In at least one embodiment, a maximum number of bins for the TU contexts 920, the EG prefix contexts 925, and the EG suffix contexts 930 can be different than seven (7) and twelve (12), respectively. For example, the maximum number of bins can be any number greater than zero—e.g., 1, 2, 3, 4, 5, 6, etc.

In at least one embodiment, the texture coordinate prediction errors can use a reduced number of contexts compared to the geometric prediction error because texture coordinate prediction errors skew towards lower values due to better predictions. In at least one embodiment, geometry predictions use geometric information of the neighboring vertices while the texture coordinate prediction error uses both geometry and texture coordinate information of the neighboring vertices.

In at least one embodiment, a prefix part (e.g., EG prefix contexts) can use "N" contexts with bin 0 to bin N-1 having their own context and bins N onward using the context of bin N-1 as described herein. In at least one embodiment, a value of N can be a predetermined constant or can be transmitted in the bitstream—e.g., in a sequence, picture, slice, submesh, etc. In at least one embodiment, the value of N can vary based on whether it is a "fine" or "coarse" category, or based on a geometry prediction error, texture prediction error, or other material property prediction errors. In at least one embodiment, the various values of N can be transmitted in the bitstream—e.g., in the sequence, picture, slice, submesh, etc. For an example, as shown in FIGS. 11A and B for the EG prefix contexts 910, the value of N can be four (4) such that the first three (e.g., 4-1) bins have their own context and bin 4 onwards uses the context of the third bin (e.g., H2).

FIGS. 12A, 12B, 12C, and 12D illustrate a simplified context scheme for a binary arithmetic coding scheme for geometry prediction error in video-based dynamic mesh coding (V-DMC), in accordance with an embodiment described herein. In one embodiment, FIGS. 12A and 12C illustrate simplified contexts for a "fine" category for a geometric prediction error and a texture coordinate prediction error, respectively. In some embodiments, FIGS. 12B and 12D illustrate simplified contexts for a "coarse" category for a geometric prediction error and a texture coordinate prediction error, respectively.

In at least one embodiment, contexts can be shared across the "fine" and "coarse" category and across the geometry prediction error, the texture prediction error, or any other material property prediction error. In at least some embodiments, the "fine" and "coarse" categories can be combined and a common set and a common number of contexts can be used for them. For example, three (3) contexts (A0-A2) are utilized for the TU context portion (e.g., TU contexts 1205, TU contexts 1220, TU contexts 1235, and TU contexts 1250) for both the "fine" and "coarse" categories of the geometry prediction error and the texture coordination prediction error. In at least one embodiment, a subset of these contexts (e.g., A0 and A1) are utilized for the TU context portion associated with "fine" category for geometry prediction errors and texture coordinate prediction errors (e.g., TU Contexts 1205 and TU contexts 1235).

In an embodiment, six (6) contexts (B0-B5) are utilized for the EG prefix context portion (e.g., EG prefix contexts 1210, EG prefix contexts 1225, EG prefix contexts 1240, and EG prefix contexts 1255) for both the "fine" and "coarse" categories of the geometry prediction error and the texture coordination prediction error. In at least one embodiment, a subset of these contexts (e.g., B0-B2) are utilized for the EG prefix context portion associated with the "coarse" category for texture coordinate prediction errors (e.g., EG Prefix Contexts 1240 and EG prefix contexts 1255).

In an embodiment, six (6) contexts (C0-C5) are utilized for the EG suffix context portion (e.g., EG suffix contexts 1215, EG suffix contexts 1230, EG suffix contexts 1245, and EG suffix contexts 1260) for both the "fine" and "coarse" categories of the geometry prediction error and the texture coordination prediction error. In at least one embodiment, a subset of these contexts (e.g., C0-C2) are utilized for the EG suffix context portion associated with the "coarse" category for texture coordinate prediction errors (e.g., EG suffix Contexts 1245 and EG suffix contexts 1260).

As described above, in V-DMC TMM 7.0, a total of 106 contexts are used for geometry prediction error and texture coordinates prediction error. However, as described herein (e.g., with reference to FIGS. 12A-D), a reduced number of contexts is used—e.g., fifteen (15). Accordingly, using a reduced number of contexts lowers context memory requirements (e.g., less contexts are stored in the memory), and can reduce the overall complexity of the system. In at least one embodiment, there can also be a bit savings since contexts for higher order bins are trained better.

Figure 13A:
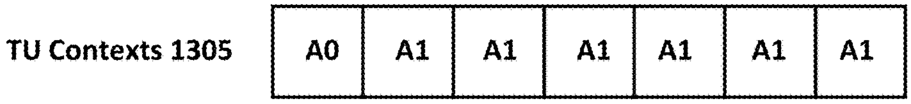
Figure 13B:
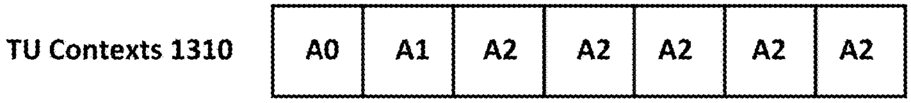
Figure 13C:
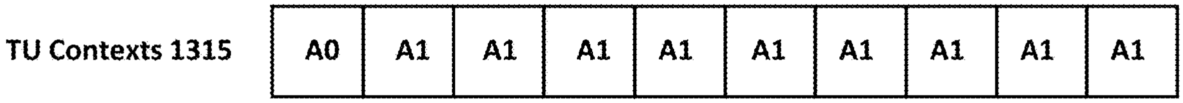
Figure 13D:
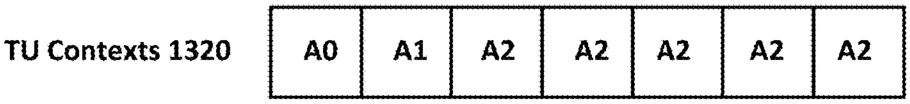

FIGS. 13A, 13B, 13C, and 13D illustrate a simplified context scheme for a binary arithmetic coding scheme for geometry prediction error and texture coordinate prediction error in video-based dynamic mesh coding (V-DMC), in accordance with an embodiment described herein. In one embodiment, FIGS. 13A and 13C illustrate simplified contexts for a "fine" category for a geometric prediction error and a texture coordinate prediction error, respectively. In some embodiments, FIGS. 13B and 13D illustrate simplified contexts for a "coarse" category for a geometric prediction error and a texture coordinate prediction error, respectively.

In at least one embodiment, a number of TU bins used can differ based on a different type of prediction error. For example, the number of TU bins used for the different types of prediction errors (e.g., geometry prediction error, texture coordinate prediction error, etc.) are adaptable based on the prediction error type. One example is illustrated with reference to FIGS. 13A-D. As illustrated, TU contexts 1305, TU contexts 1310, and TU contexts 1320 use seven (7) TU bins—e.g., 7 TU bins are used for geometry prediction errors in the "fine" and "coarse" category and for texture coordinate prediction errors in the "coarse" category. In this example, TU contexts 1315 utilize ten (10) bins—e.g., 10 TU bins are used for texture coordinate prediction error in the "fine" category. It should be noted 7 bins and 10 bins are used as examples only. The system can implement any number of bins—e.g., the system can use 1, 2, 3, 4, 5, etc. number of bins for the TU contexts.

In at least one embodiment, an order "k" of the exp-golomb code used is adapted based on a type of prediction error—e.g., different types of prediction errors can utilize a different "k" order. For example, the geometry prediction error in the "fine" and "coarse" category and the texture prediction coordinates in the "coarse" category can utilize k=2 for the EG code. In such embodiments, the texture prediction coordinates in the "fine" category can utilize k=1 for the EG code. In at least one embodiment, a system can implement the adaptive selection of order "k", the adaptive TU length selection as illustrated in FIGS. 13A-D, and utilize the optimization of FIGS. 12A-D (e.g., with regards to the reduced contexts in the EG prefix and EG suffix contexts). In at least one embodiment, this combination can lead to a savings in bits.

Figure 14A:
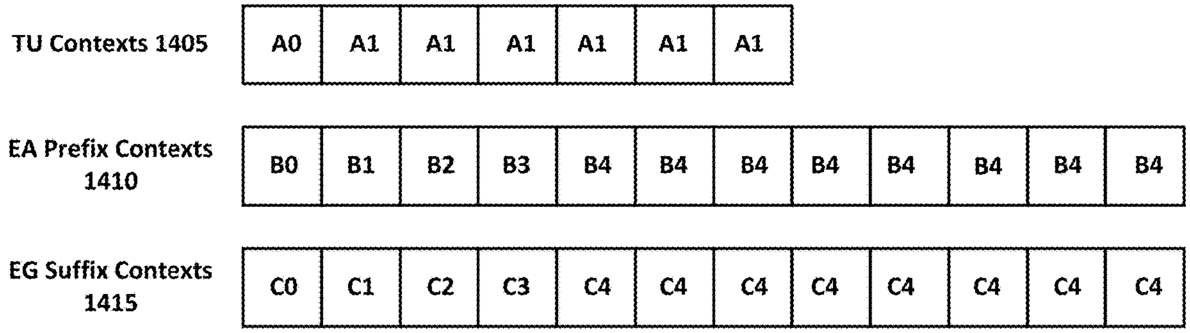
Figure 14B:
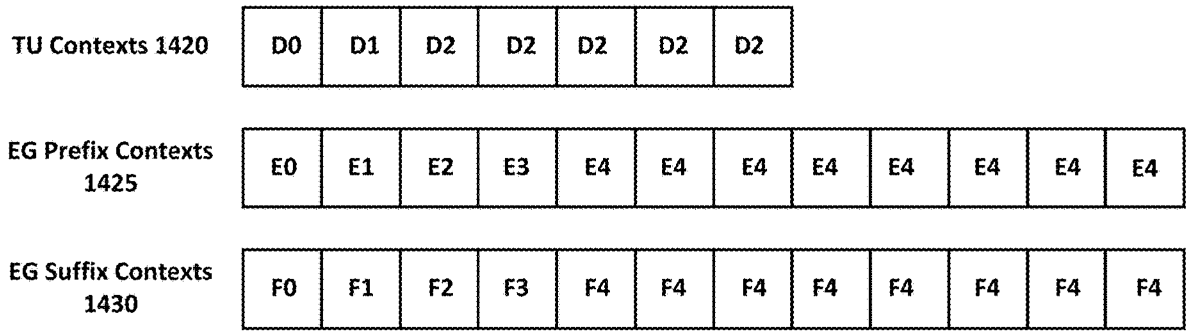

FIGS. 14A and 14B illustrate a simplified context scheme for a binary arithmetic coding scheme for geometry prediction error in video-based dynamic mesh coding (V-DMC), in accordance with an embodiment described herein. In one embodiment, FIG. 14A illustrates simplified contexts for a "fine" category for a geometric prediction error. In some embodiments, FIG. 14B illustrates simplified contexts for a "coarse" category for a geometric prediction error.

For example, as illustrated in FIG. 14A, for the "fine" category of the geometric prediction error, there can be a maximum of seven (7) bins that use two contexts (e.g., A0 or A1) for the TU contexts 1405. In some embodiments, the EG prefix contexts 1410 portion of the codeword uses twelve (12) bins that use five (5) contexts (e.g., B0-B4). In such embodiments, bins 0-4 have their own context (e.g., B0-B4) and bin 5 onward (e.g., bins 5-11) reuse the context of bin 4 (e.g., B4). In at least one embodiment, the EG suffix contexts 1415 portion of the codeword use twelve (12) bins that use five (5) contexts (e.g., C0-C4). In such embodiments, bins 0-4 have their own context (e.g., C0-C4) and bin 5 onward (e.g., bins 5-11) reuse the context of bin 4 (e.g., C4). In at least one embodiment, a number of maximum bins for TU contexts 1405, EG prefix contexts 1410, and EG suffix contexts 1415 can be different than seven (7) and twelve (12), respectively. For example, the maximum number of bins can be any number greater than zero e.g., 1, 2, 3, 4, 5, 6, etc.

As illustrated in FIG. 14B, for a "coarse" category of the geometric prediction error, there can be a maximum of seven (7) bins that use three contexts (e.g., D0, D1, or D2) for the TU contexts 1420. In some embodiments, the EG prefix contexts 1425 portion of the codeword uses twelve (12) bins that use five (5) contexts (e.g., E0-E4). In such embodiments, bins 0-4 have their own context (e.g., E0-E4) and bin 5 onward (e.g., bins 5-11) reuse the context of bin 4 (e.g., E4). In at least one embodiment, the EG suffix contexts 1430 portion of the codeword use twelve (12) bins that use five (5) contexts (e.g., F0-F4). In such embodiments, bins 0-4 have their own context (e.g., F0-F4) and bin 5 onward (e.g., bins 5-11) reuse the context of bin 4 (e.g., F4). In at least one embodiment, a number of maximum bins for TU contexts 1420, EG prefix contexts 1425, and EG suffix contexts 1430 can be different than seven (7) and twelve (12), respectively. For example, the maximum number of bins can be any number greater than zero—e.g., 1, 2, 3, 4, 5, 6, etc.

Figure 15A:
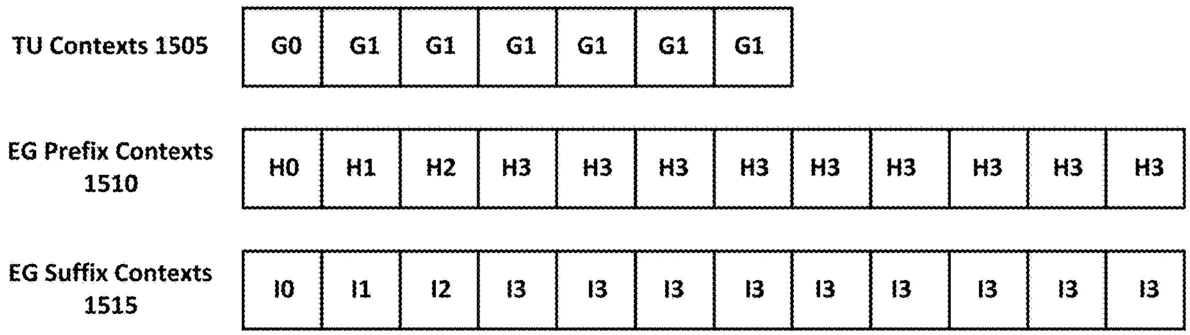
Figure 15B:
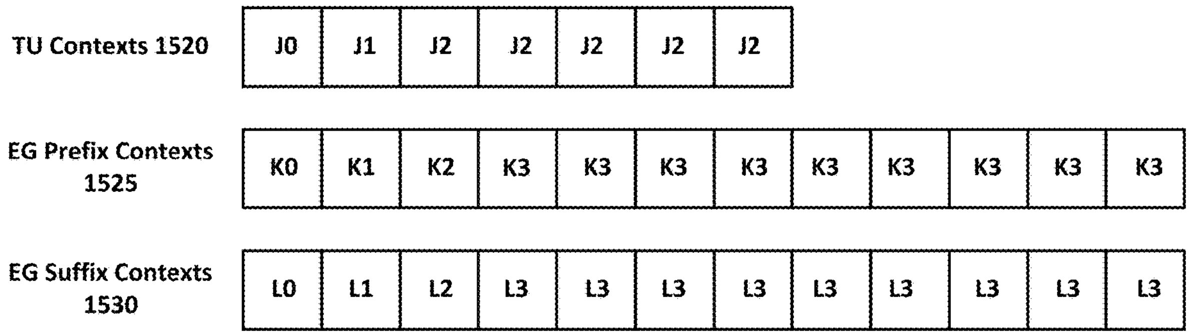

FIGS. 15A and 15B illustrate a simplified context scheme for a binary arithmetic coding scheme for geometry prediction error in video-based dynamic mesh coding (V-DMC), in accordance with an embodiment described herein. In one embodiment, FIG. 15A illustrates simplified contexts for a "fine" category for a texture coordinate prediction error. In some embodiments, FIG. 15B illustrates simplified contexts for a "coarse" category for a texture coordinate prediction error.

For example, as illustrated in FIG. 15A, for a "fine" category of the texture coordinates prediction error, there can be a maximum of seven (7) bins that use two contexts (e.g., G0 or G1) for the TU contexts 1505. In some embodiments, the EG prefix contexts 1510 portion of the codeword uses twelve (12) bins that use four (4) contexts (e.g., H0-H3). In such embodiments, bins 0-3 have their own context (e.g. H0, H1, H2, and H3) and bin 4 onwards (e.g., bins 4-11) reuse the context of bin 3 (e.g., H3). In at least one embodiment, the EG suffix contexts 1515 portion of the codeword use twelve (12) bins that use four (4) contexts (e.g., I0-I3). In such embodiments, bins 0-3 have their own context (e.g. I0, I1, I2, and I3) and bin 4 onwards (e.g., bins 4-11) reuse the context of bin 3 (e.g., I3). In at least one embodiment, a number of maximum bins for TU contexts 1505, EG prefix contexts 1510, and EG suffix contexts 1515 can be different than seven (7) and twelve (12), respectively. For example, the maximum number of bins can be any number greater than zero—e.g., 1, 2, 3, 4, 5, 6, etc.

As illustrated in FIG. 15B, for a "coarse" category of the texture coordinates prediction error, there can be a maximum of seven (7) bins that use three contexts (e.g., J0, J1, or J2) for the TU contexts 1520. In some embodiments, the EG prefix contexts 1525 portion of the codeword uses twelve (12) bins that use four (4) contexts (e.g., K0-K3). In such embodiments, bins 0-3 have their own context (e.g. K0, K1, K2, and K3) and bin 4 onwards (e.g., bins 4-11) reuse the context of bin 3 (e.g., K3). In at least one embodiment, the EG suffix contexts 1530 portion of the codeword use twelve (12) bins that use four (3) contexts (e.g., L0-L3). In such embodiments, bins 0-3 have their own context (e.g. L0, L1, L2, and L3) and bin 4 onwards (e.g., bins 4-11) reuse the context of bin 3 (e.g., L3). In at least one embodiment, a number of maximum bins for TU contexts 1520, EG prefix contexts 1525, and EG suffix contexts 1530 can be different than seven (7) and twelve (12), respectively. For example, the maximum number of bins can be any number greater than zero—e.g., 1, 2, 3, 4, 5, 6, etc.

In at least one embodiment, the texture coordinate prediction errors can use a reduced number of contexts compared to the geometric prediction error because texture coordinate prediction errors skew towards lower values due to better predictions. In at least one embodiment, geometry predictions use geometric information of the neighboring vertices while the texture coordinate prediction error uses both geometry and texture coordinate information of the neighboring vertices.

FIGS. 16A, 16B, 16C, and 16D illustrate a simplified context scheme for a binary arithmetic coding scheme for geometry prediction error in video-based dynamic mesh coding (V-DMC), in accordance with an embodiment described herein. In one embodiment, FIGS. 16A and 16C illustrate simplified contexts for a "fine" category for a geometric prediction error and a texture coordinate prediction error, respectively. In some embodiments, FIGS. 16B and 16D illustrate simplified contexts for a "coarse" category for a geometric prediction error and a texture coordinate prediction error, respectively. It should be noted that while a maximum number of seven (7) bins is shown for TU contexts 1205, TU contexts 1220, TU contexts 1235, TU contexts 1250 (e.g., for the "fine" and "coarse" category for a geometric or texture coordinate prediction error), any number of maximum bins can be used. For example, the maximum number of bins for the TU portion of the codeword can be 1, 2, 3, 4, 5, 6, etc. Additionally, while a maximum number of twelve (12) bins is shown for the EG prefix and EG suffix portions of the codeword (e.g., EG prefix contexts 1210, EG prefix contexts 1225, EG prefix contexts 1240, EG prefix contexts 1255, EG suffix contexts 1215, EG suffix contexts 1230, EG suffix contexts 1245, and EG suffix contexts 1260), any number of maximum bins can be used. For example, the maximum number of bins for the EG prefix and EG suffix portion of the codeword can be 1, 2, 3, 4, 5, 6, etc.

In at least one embodiment, an N number of contexts (e.g., $P_0$, $P_1$, . . . , $P_{N-1}$) are reserved for coding of a "fine" and "coarse" categories of the geometry prediction error, the texture coordinate prediction error, and other attribute prediction errors (e.g., normal prediction error, etc.). In at least one embodiment, (e.g., as illustrated in FIGS. 16A-D), an EG prefix part (e.g., EG prefix context 1210, EG prefix context 1225, EG prefix context 1240, EG prefix context 1255) can use a subset M of these contexts—e.g., where M≤N. For example, bin 0 to bin M-1 use contexts $P_0$, $P_1$, . . . , $P_{M-1}$ respectively. In such embodiments, bin M onwards uses the context of Bin M-1. In some embodiments, a value of M can differ based on a different type of prediction error (e.g., based on a "fine" category, a "coarse" category, a geometry prediction error, a texture coordinate prediction error, attribute prediction error, normal prediction error, etc.). In some embodiments, an EG suffix part (e.g., EG suffix context 1215, EG suffix context 1230, EG suffix context 1245, EG suffix context 1260) can use a subset Q of the contexts N—e.g., where Q≤N. For example, bin 0 to bin Q-1 uses contexts $P_0$, $P_1$, . . . , $P_{Q-1}$ respectively. In such embodiments, bin Q onwards uses the context of Bin Q-1. In some embodiments, a value of Q can differ based on a different type of prediction error (e.g., based on a "fine" category, a "coarse" category, a geometry prediction error, a texture coordinate prediction error, attribute prediction error, normal prediction error, etc.). In some embodiments, the value of M and Q for the different prediction types can be a predetermined constant or can be transmitted in the bitstream—e.g., in the sequence, picture, slice, sub-mesh, etc.

In at least one embodiment, contexts can be shared across the "fine" and "coarse" category and across the geometry prediction error, the texture prediction error, or any other material property prediction error. In at least some embodiments, the "fine" and "coarse" categories can be combined and a common set and a common number of contexts can be used for them. For example, three (3) contexts (A0-A2) are utilized for the TU context portion (e.g., TU contexts 1205, TU contexts 1220, TU contexts 1235, and TU contexts 1250) for both the "fine" and "coarse" categories of the geometry prediction error and the texture coordination prediction error. In at least one embodiment, a subset of these contexts (e.g., A0 and A1) are utilized for the TU context portion associated with "fine" category for geometry prediction errors and texture coordinate prediction errors (e.g., TU Contexts 1205 and TU contexts 1235).

In an embodiment, five (5) contexts (B0-B4) are utilized for the EG prefix context portion (e.g., EG prefix contexts 1210, EG prefix contexts 1225, EG prefix contexts 1240, and EG prefix contexts 1255) for both the "fine" and "coarse" categories of the geometry prediction error and the texture coordination prediction error. In at least one embodiment, a subset of these contexts (e.g., a value M, B0-B3) are utilized for the EG prefix context portion associated with the "coarse" category for texture coordinate prediction errors (e.g., EG Prefix Contexts 1240 and EG prefix contexts 1255).

In an embodiment, five (5) contexts (C0-C4) are utilized for the EG suffix context portion (e.g., EG suffix contexts 1215, EG suffix contexts 1230, EG suffix contexts 1245, and EG suffix contexts 1260) for both the "fine" and "coarse" categories of the geometry prediction error and the texture coordination prediction error. In at least one embodiment, a subset of these contexts (e.g., C0-C3) are utilized for the EG suffix context portion associated with the "coarse" category for texture coordinate prediction errors (e.g., EG suffix Contexts 1245 and EG suffix contexts 1260). In at least one embodiment, FIGS. 16A-D illustrates that a value of M and Q is different than a value of N—e.g., a different number is used for the subset for the texture coordinate prediction error versus the geometry prediction error, where the value of M and Q are based on the type of prediction error.

FIGS. 17A, 17B, 17C, and 17D illustrate a simplified context scheme for a binary arithmetic coding scheme for geometry prediction error in video-based dynamic mesh coding (V-DMC), in accordance with an embodiment described herein. In one embodiment, FIGS. 17A and 17C illustrate simplified contexts for a "fine" category for a geometric prediction error and a texture coordinate prediction error, respectively. In some embodiments, FIGS. 17B and 17D illustrate simplified contexts for a "coarse" category for a geometric prediction error and a texture coordinate prediction error, respectively. It should be noted that while a maximum number of seven (7) bins is shown for TU contexts 1705, TU contexts 1720, TU contexts 1735, TU contexts 1750 (e.g., for the "fine" and "coarse" category for a geometric or texture coordinate prediction error), any number of maximum bins can be used. For example, the maximum number of bins for the TU portion of the codeword can be 1, 2, 3, 4, 5, 6, etc. Additionally, while a maximum number of twelve (12) bins is shown for the EG prefix and EG suffix portions of the codeword (e.g., EG prefix contexts 1710, EG prefix contexts 1725, EG prefix contexts 1740, EG prefix contexts 1755, EG suffix contexts 1715, EG suffix contexts 1730, EG suffix contexts 1745, and EG suffix contexts 1760), any number of maximum bins can be used. For example, the maximum number of bins for the EG prefix and EG suffix portion of the codeword can be 1, 2, 3, 4, 5, 6, etc.

In at least one embodiment, an N number of contexts (e.g., $P_0$, $P_1$, . . . , $P_{N-1}$) are reserved for coding of a "fine" and "coarse" categories of the geometry prediction error, the texture coordinate prediction error, and other attribute prediction errors (e.g., normal prediction error, etc.). In at least one embodiment, (e.g., as illustrated in FIGS. 17A-D), an EG prefix part (e.g., EG prefix context 1710, EG prefix context 1725, EG prefix context 1740, EG prefix context 1755) can use a subset M of these contexts—e.g., where M≤N. For example, bin 0 to bin M-1 use contexts $P_0$, $P_1$, . . . , $P_{M-1}$ respectively. In such embodiments, bin M onwards uses the context of Bin M-1 or alternatively are bypass coded as illustrated in FIGS. 17A-D. In some embodiments, a value of M can differ based on a different type of prediction error (e.g., based on a "fine" category, a "coarse" category, a geometry prediction error, a texture coordinate prediction error, attribute prediction error, normal prediction error, etc.). In some embodiments, an EG suffix part (e.g., EG suffix context 1715, EG suffix context 1730, EG suffix context 1745, EG suffix context 1760) can use a subset Q of the contexts N—e.g., where Q≤N. For example, bin 0 to bin Q-uses contexts $P_0$, $P_1$, . . . , $P_{Q-1}$ respectively. In such embodiments, bin Q onwards uses the context of Bin Q-1 or alternatively are bypass coded as illustrated in FIGS. 17A-D. In some embodiments, a value of Q can differ based on a different type of prediction error (e.g., based on a "fine" category, a "coarse" category, a geometry prediction error, a texture coordinate prediction error, attribute prediction error, normal prediction error, etc.). In some embodiments, the value of M and Q for the different prediction types can be a predetermined constant or can be transmitted in the bitstream—e.g., in the sequence, picture, slice, sub-mesh, etc.

In at least one embodiment, contexts can be shared across the "fine" and "coarse" category and across the geometry prediction error, the texture prediction error, or any other material property prediction error. In at least some embodiments, sharing the contexts can cause significant context savings and bit savings since the contexts for the higher order bins get better trained and the contexts are better initialized between the different types of prediction error.

For example, three (3) contexts (A0-A2) are utilized for the TU context portion (e.g., TU contexts 1705, TU contexts 1720, TU contexts 1735, and TU contexts 1750) for both the "fine" and "coarse" categories of the geometry prediction error and the texture coordination prediction error. In at least one embodiment, a subset of these contexts (e.g., A0 and A1) are utilized for the TU context portion associated with "fine" category for geometry prediction errors and texture coordinate prediction errors (e.g., TU Contexts 1705 and TU contexts 1735).

In an embodiment, five (5) contexts (B0-B4) are utilized for the EG prefix context portion (e.g., EG prefix contexts 1710, EG prefix contexts 1725, EG prefix contexts 1740, and EG prefix contexts 1755) for both the "fine" and "coarse" categories of the geometry prediction error and the texture coordination prediction error. In at least one embodiment, a subset of these contexts (e.g., B0-B3) are utilized for the EG prefix context portion associated with the "coarse" category for texture coordinate prediction errors (e.g., EG Prefix Contexts 1740 and EG prefix contexts 1755). In at least one embodiment, portions of the EG prefix bins are bypassed coded, indicated by a "B". For example, for EG prefix 1710 and EG prefix 1175 (e.g., for the "fine" and "coarse" category of the geometry prediction error), bins 0-4 have their own context (e.g., B0-B4), and bin 5 onwards (e.g., bins 5-11) are bypass coded. In another example, for EG prefix 1740 and EG prefix 1755 (e.g., for the "fine" and "coarse" category of the texture coordinate prediction error), bins 0-3 have their own context (e.g., B0-B3), bin 4 reuses the bin 3 context (e.g., B3), and bin 5 onwards (e.g., bins 5-11) are bypass coded.

In an embodiment, five (5) contexts (C0-C4) are utilized for the EG suffix context portion (e.g., EG suffix contexts 1715, EG suffix contexts 1730, EG suffix contexts 1745, and EG suffix contexts 1760) for both the "fine" and "coarse" categories of the geometry prediction error and the texture coordination prediction error. In at least one embodiment, a subset of these contexts (e.g., C0-C3) are utilized for the EG suffix context portion associated with the "coarse" category for texture coordinate prediction errors (e.g., EG suffix Contexts 1745 and EG suffix contexts 1760). For example, for EG suffix 1715 and EG suffix 1730 (e.g., for the "fine" and "coarse" category of the geometry prediction error), bins 0-4 have their own context (e.g., C0-C4), and bin 5 onwards (e.g., bins 5-11) reuse the bin 4 context (e.g., C4). In another example, for EG suffix 1745 and EG suffix 1760 (e.g., for the "fine" and "coarse" category of the texture coordinate prediction error), bins 0-3 have their own context (e.g., C0-C3), bin 4 reuses the bin 3 context (e.g., C3), and bin 5 onwards (e.g., bins 5-11) reuse bin 3 (e.g., C3). In one embodiment, in V-DMC TMM 8.0, there are a total of 78 contexts used for geometry and texture coordinate prediction error. In one embodiment, e.g., as shown in FIGS. 17A-D, 13 total contexts are used leading to a significant reduction in context memory storage and complexity.

In one embodiment, the following Table 1 can illustrate syntax elements for a binary arithmetic coding scheme having the contexts illustrated in FIGS. 17A-D:

TABLE 1

| Syntax Element | CtxTbl | CtxIdx | | Count |
|---|---|---|---|---|
| mesh_position_fine_residual[ ][ ] | 1 | Offset | Min (1, BinIdxTu) | 2 |
| | | Prefix (BinIdxPfx <= 4) | 2 + Min (4, BinIdxPfx) | 5 |
| | | Prefix (BinIdxPfx > 4) | bypass | 0 |
| | | Suffix | 7 + Min (4, BinIdxSfx) | 5 |
| | | Sign | bypass | 0 |
| mesh_position_coarse_residual[ ][ ] | 1 | Offset | Min (2, BinIdxTu) | 3 |
| | | Prefix (BinIdxPfx <= 4) | 3 + Min (4, BinIdxPfx) | 5 |
| | | Prefix (BinIdxPfx > 4) | bypass | 0 |
| | | Suffix | 8 + Min (4, BinIdxSfx) | 5 |
| | | Sign | bypass | 0 |
| mesh_attribute_fine_residual[ ][ ][ ] /* TEXCOORD */ | 1 | Offset | Min (1, BinIdxTu) | 2 |
| nbPfxCtx = 5, nbSfxCtx = 4 /* NORMAL */ nbPfxCtx = nbSfxCtx = 12 | | Prefix (BinIdxPfx <= nbPfxCtx − 1) | 2 + Min(nbPfxCtx − 1, BinIdxPfx) | 12 |
| /* MATERIAL_ID */ nbPfxCtx = nbSfxCtx = 8 | | Prefix (BinIdxPfx > nbPfxCtx − 1) | bypass | 0 |
| | | Suffix | 14 + Min(nbSfxCtx − 1, BinIdxSfx) | 12 |
| | | Sign | bypass | 0 |
| mesh_attribute_coarse_residual[ ][ ][ ] /* TEXCOORD */ | 1 | Offset | Min(2, BinIdxTu) | 3 |
| nbPfxCtx = 5, nbSfxCtx = 4 /* NORMAL */ nbPfxCtx = nbSfxCtx = 12 | | Prefix (BinIdxPfx <= nbPfxCtx − 1) | 3 + Min(nbPfxCtx − 1, BinIdxPfx) | 12 |
| | | Prefix (BinIdxPfx > | bypass | 0 |

TABLE 1-continued

| Syntax Element | CtxTbl | CtxIdx | Count |
|---|---|---|---|
| | nbPfxCtx − 1) | | |
| | Suffix | 15 + Min(nbSfxCtx − 1, BinIdxSfx) | 12 |
| | Sign | bypass | 0 |

In at least one embodiment, a syntax element mesh_position_fine_residual refers to the geometry prediction error for the "fine category," a syntax element mesh_position_coarse_residual refers to the geometry prediction error for the "coarse category," a syntax element mesh_attribute_fine_residual refers to an attribute prediction error (e.g., including a texture coordinate prediction error (TEXCORD, normal prediction error (NORMAL), or material prediction error (MATERIAL ID)) for the "fine category," and a syntax element mesh_attribute_coarse_residual refers to an attribute prediction error (e.g., including a texture coordinate prediction error (TEXCORD, normal prediction error (NORMAL)) for the "coarse category." In at least one embodiment, a nbPfxCtx can refer to a number of prefix contexts and nbSfxCtx can refer to a number of suffix contexts.

In at least one embodiment a CtxTbl element can refer to a context table and CtxIdx element can refer to a context identification. In at least one embodiment, the CtxTbl value can be one (1) when sharing contexts across the geometry prediction error and the texture coordinate prediction error for the "fine" and "coarse" category. In some embodiments, a first column of the CtxIdx identifies a portion of the codeword, a second column of the CtxIdx identifies a location (e.g., bin number) of the codeword, and a third column of the CtxIdx indicates a context count. For example, Offset can refer to the TU portion of the codeword, Prefix can refer to the prefix portion of the codeword, and Suffix can refer to the suffix portion of the codeword. In one embodiment, the location of the codeword is determined based on the conditions provided. For example, the location column can indicate the offset portion spans at least one bin to a maximum number determined by a number of TU bins used, then indicate the prefix portion spans from after the TU portion (e.g., at bin 3) to a maximum number determined by a number of suffix bins used (e.g., from bin 3 to the number of suffix bins used), etc. In some embodiments, Table I can also indicate when to reuse a context or bypass. For example, BinIdxPfx<=4 can indicate a value to assign EG prefix bins 0-4 while BinIdxPfx>4 can indicate a value to assign EG prefix bins greater than 5. In some embodiments, the count can refer to a maximum number of contexts used for a given portion of the codeword.

In at least one embodiment, Table 1 is included as table K-8 in the CD of V-DMC, ISO/IEC SC29 WG07 N00885, June 2024—e.g., a table for values of CtxTbl and CtxIdx for MPEG Edge Breaker binarized ac (v) coded syntax elements.

FIGS. 18A, 18B, 18C, and 18D illustrate a simplified context scheme for a binary arithmetic coding scheme for geometry prediction error in video-based dynamic mesh coding (V-DMC), in accordance with an embodiment described herein. In one embodiment, FIGS. 18A and 18C illustrate simplified contexts for a "fine" category for a geometric prediction error and a texture coordinate prediction error, respectively. In some embodiments, FIGS. 18B and 18D illustrate simplified contexts for a "coarse" category for a geometric prediction error and a texture coordinate prediction error, respectively. It should be noted that while a maximum number of seven (7) bins is shown for TU contexts 1805, TU contexts 1820, TU contexts 1835, TU contexts 1850 (e.g., for the "fine" and "coarse" category for a geometric or texture coordinate prediction error), any number of maximum bins can be used. For example, the maximum number of bins for the TU portion of the codeword can be 1, 2, 3, 4, 5, 6, etc. Additionally, while a maximum number of twelve (12) bins is shown for the EG prefix and EG suffix portions of the codeword (e.g., EG prefix contexts 1810, EG prefix contexts 1825, EG prefix contexts 1840, EG prefix contexts 1855, EG suffix contexts 1815, EG suffix contexts 1830, EG suffix contexts 1845, and EG suffix contexts 1860), any number of maximum bins can be used. For example, the maximum number of bins for the EG prefix and EG suffix portion of the codeword can be 1, 2, 3, 4, 5, 6, etc.

For example, three (3) contexts (A0-A2) are utilized for the TU context portion (e.g., TU contexts 1805, TU contexts 1820, TU contexts 1835, and TU contexts 1850) for both the "fine" and "coarse" categories of the geometry prediction error and the texture coordination prediction error. In at least one embodiment, a subset of these contexts (e.g., A0 and A1) are utilized for the TU context portion associated with "fine" category for geometry prediction errors and texture coordinate prediction errors (e.g., TU Contexts 1805 and TU contexts 1835).

In an embodiment, five (5) contexts (B0-B4) are utilized for the EG prefix context portion (e.g., EG prefix contexts 1810, EG prefix contexts 1825, EG prefix contexts 1840, and EG prefix contexts 1855) for both the "fine" and "coarse" categories of the geometry prediction error and the texture coordination prediction error. In at least one embodiment, a subset of these contexts (e.g., B0-B3) are utilized for the EG prefix context portion associated with the "coarse" category for texture coordinate prediction errors (e.g., EG Prefix Contexts 1840 and EG prefix contexts 1855). In at least one embodiment, portions of the EG prefix bins are bypassed coded, indicated by a "B". For example, for EG prefix 1810 and EG prefix 1825 (e.g., for the "fine" and "coarse" category of the geometry prediction error), bins 0-4 have their own context (e.g., B0-B4), bin 5 reuses the bin 4 context (e.g., B4) and bin 6 onwards (e.g., bins 6-11) are bypass coded. In another example, for EG prefix 1840 and EG prefix 1855 (e.g., for the "fine" and "coarse" category of the texture coordinate prediction error), bins 0-3 have their own context (e.g., B0-B3), bin 4 and bin 5 reuse the bin 3 context (e.g., B3), and bin 6 onwards (e.g., bins 6-11) are bypass coded.

In an embodiment, five (5) contexts (C0-C4) are utilized for the EG suffix context portion (e.g., EG suffix contexts 1815, EG suffix contexts 1830, EG suffix contexts 1845, and EG suffix contexts 1860) for both the "fine" and "coarse" categories of the geometry prediction error and the texture coordination prediction error. In at least one embodiment, a subset of these contexts (e.g., C0-C3) are utilized for the EG suffix context portion associated with the “coarse” category for texture coordinate prediction errors (e.g., EG suffix Contexts 1845 and EG suffix contexts 1860). In at least one embodiment, portions of the EG suffix bins are bypassed coded, indicated by a “B.” For example, for EG suffix 1815 and EG suffix 1830 (e.g., for the “fine” and “coarse” category of the geometry prediction error), bins 0-4 have their own context (e.g., C0-C4), bin 5 reuses the bin 4 context (e.g., C4) and bin 6 onwards (e.g., bins 6-11) are bypass coded. In another example, for EG suffix 1845 and EG suffix 1860 (e.g., for the “fine” and “coarse” category of the texture coordinate prediction error), bins 0-3 have their own context (e.g., C0-C3), bin 4 and bin 5 reuse the bin 3 context (e.g., C3), and bin 6 onwards (e.g., bins 6-11) are bypass coded.

In one embodiment, the following Table 2 can illustrate syntax elements for a binary arithmetic coding scheme having the contexts illustrated in FIGS. 18A-D:

TABLE 2

| Syntax Element | CtxTbl | CtxIdx | | Count |
|---|---|---|---|---|
| mesh__position__fine__residual[ ][ ] | 1 | Offset | Min(1, BinIdxTu) | 3 |
| | | Prefix (BinIdxPfx <= 5) | 3 + Min(4, BinIdxPfx) | 5 |
| | | Prefix (BinIdxPfx > 5) | bypass | 0 |
| | | Suffix (BinIdxSfx <= 5) | 8 + Min(4, BinIdxSfx) | 5 |
| | | Suffix (BinIdxSfx > 5) | bypass | 0 |
| | | Sign | bypass | 0 |
| mesh__position__coarse__residual[ ][ ] | 1 | Offset | Min(2, BinIdxTu) | 0 |
| | | Prefix (BinIdxPfx <= 5) | 3 + Min(4, BinIdxPfx) | 0 |
| | | Prefix (BinIdxPfx > 5) | bypass | 0 |
| | | Suffix (BinIdxSfx <= 5) | 8 + Min(4, BinIdxSfx) | 0 |
| | | Suffix (BinIdxSfx > 5) | bypass | 0 |
| | | Sign | bypass | 0 |
| mesh__attribute__fine__residual[ ][ ][ ]<br>/* TEXCOORD */<br>nbPfxCtx = 4, nbSfxCtx = 4<br>/* NORMAL */<br>nbPfxCtx = nbSfxCtx = 12<br>/* MATERIAL__ID */<br>nbPfxCtx = nbSfxCtx = 8 | 1 | Offset | Min(1, BinIdxTu) | 0 |
| | | Prefix (BinIdxPfx <= nbPfxCtx − 1) | 3 + Min(nbPfxCtx − 1, BinIdxPfx) | 0 |
| | | Prefix (BinIdxPfx > nbPfxCtx − 1) | bypass | 0 |
| | | Suffix (BinIdxSfx <= nbSfxCtx − 1) | 8 + Min(nbSfxCtx − 1, BinIdxSfx) | 0 |
| | | Suffix (BinIdxSfx > nbSfxCtx − 1) | bypass | 0 |
| | | Sign | bypass | 0 |
| mesh__attribute__coarse__residual[ ][ ][ ]<br>/* TEXCOORD */<br>nbPfxCtx = 4, nbSfxCtx = 4<br>/* NORMAL */<br>nbPfxCtx = nbSfxCtx = 12 | 1 | Offset | Min(2, BinIdxTu) | 0 |
| | | Prefix (BinIdxPfx <= nbPfxCtx − 1) | 3 + Min(nbPfxCtx − 1, BinIdxPfx) | 0 |
| | | Prefix (BinIdxPfx > nbPfxCtx − 1) | bypass | 0 |
| | | Suffix (BinIdxSfx <= nbSfxCtx − 1) | 8 + Min(nbSfxCtx − 1, BinIdxSfx) | 0 |
| | | Suffix (BinIdxSfx > nbSfxCtx − 1) | bypass | 0 |
| | | Sign | bypass | 0 |

In at least one embodiment, a syntax element mesh_position_fine_residual refers to the geometry prediction error for the "fine category," a syntax element mesh_position_coarse_residual refers to the geometry prediction error for the "coarse category," a syntax element mesh_attribute_fine_residual refers to an attribute prediction error (e.g., including a texture coordinate prediction error (TEXCORD, normal prediction error (NORMAL), or material prediction error (MATERIAL ID)) for the "fine category," and a syntax element mesh_attribute_coarse_residual refers to an attribute prediction error (e.g., including a texture coordinate prediction error (TEXCORD, normal prediction error (NORMAL)) for the "coarse category." In at least one embodiment, a nbPfxCtx can refer to a number of prefix contexts and nbSfxCtx can refer to a number of suffix contexts.

In at least one embodiment a CtxTbl element can refer to a context table and CtxIdx element can refer to a context identification. In at least one embodiment, the CtxTbl value can be one (1) when sharing contexts across the geometry prediction error and the texture coordinate prediction error for the "fine" and "coarse" category. In some embodiments, a first column of the CtxIdx identifies a portion of the codeword, a second column of the CtxIdx identifies a location (e.g., bin number) of the codeword, and a third column of the CtxIdx indicates a context count. In one embodiment, the count can be zero (0) for the geometry prediction "coarse" category and for the texture coordinate predictions (e.g., both "fine" and "coarse") when reusing contexts across geometry and texture attribute prediction errors (e.g., as well as across the "fine" and "coarse" category). That is, because the contexts are reused, there are no additional contexts to count.

In one embodiment, Offset can refer to the TU portion of the codeword, Prefix can refer to the prefix portion of the codeword, and Suffix can refer to the suffix portion of the codeword. In one embodiment, the location of the codeword is determined based on the conditions provided. For example, the location column can indicate the offset portion spans at least one bin to a maximum number determined by a number of TU bins used, then indicate the prefix portion spans from after the TU portion (e.g., at bin 3) to a maximum number determined by a number of suffix bins used (e.g., from bin 3 to the number of suffix bins used), etc. In some embodiments, Table 2 can also indicate when to reuse a context or bypass. For example, suffix (BinIdxSfx≤5) and suffix (BinIdxSfx>5) can indicate to use a context when at bin 5 or less and bypass when at bin 6 or greater.

In at least one embodiment, portions of Table 2 are included as table K-12 in the DIS of V-DMC, ISO/IEC SC29 WG07 N01099—e.g., a table for values of CtxTbl and CtxIdx for MPEG Edge Breaker binarized ac (v) coded syntax elements.

Figure 19:
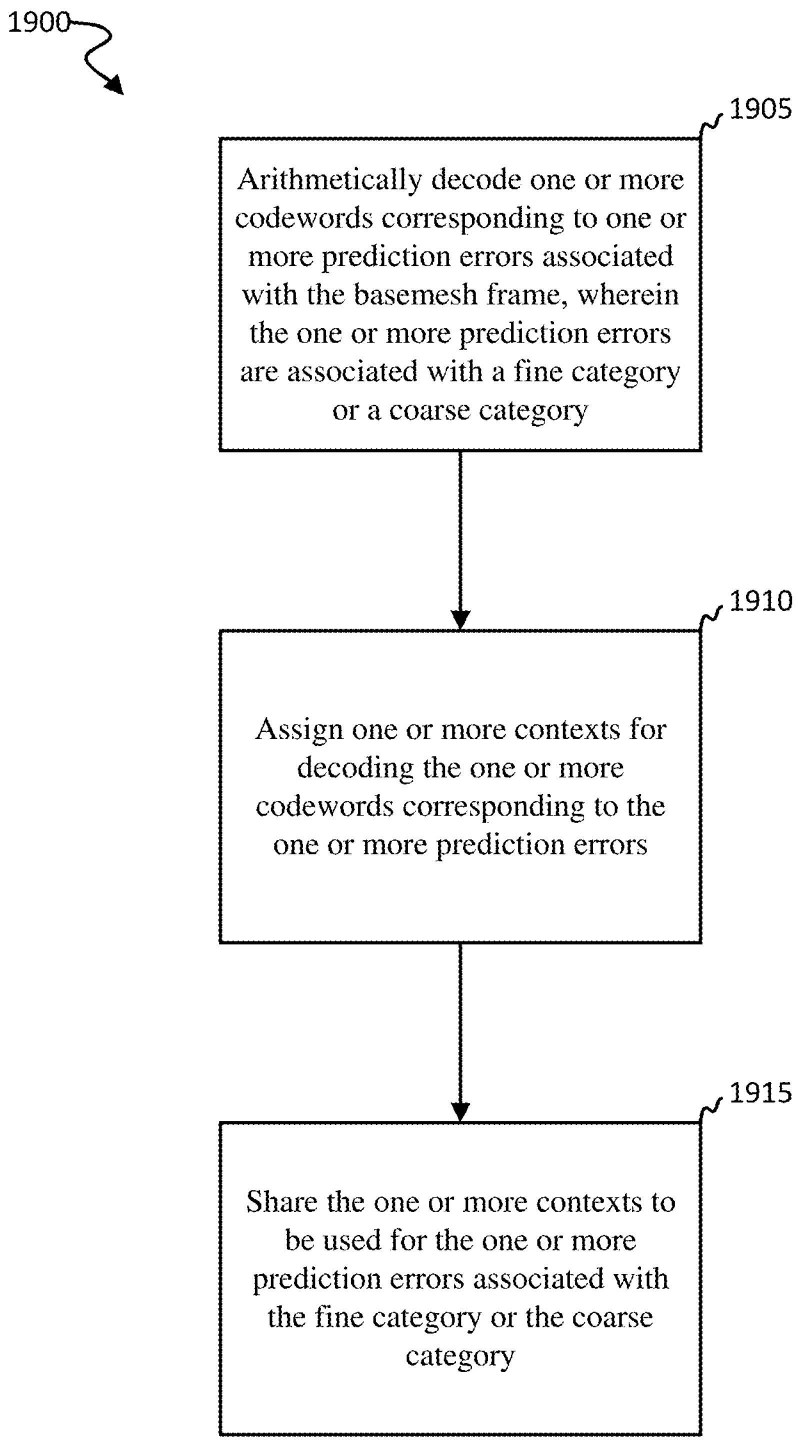
FIG. 19 illustrates a flowchart showing operations of a basemesh encoder in accordance with an embodiment.

FIG. 19 is a flowchart showing operations of a basemesh decoder in accordance with an embodiment. In at least one embodiment, operations described with reference to FIG. 19 can be performed by a basemesh decoder 525 as described with reference to FIG. 5.

At operation 1905, a basemesh decoder (e.g., a processor of the basemesh decoder) arithmetically decodes one or more codewords corresponding to one or more prediction errors associated with a basemesh frame, where the one or more prediction errors are associated with a fine category or a coarse category. In at least one embodiment, the basemesh frame is decoded using a Moving Pictures Expert Group (MPEG) EdgeBreaker (MEB) static mesh coding. In at least one embodiment, the one or more codewords includes one or more portions. For example, the codeword can include a portion associated with a truncated unary binarization, a portion associated with an exponential Golomb prefix binarization, and a portion associated with an exponential Golomb suffix binarization as described with reference to FIGS. 18A-D. In at least one embodiment, the one or more prediction errors include one of a fine geometry prediction error, a coarse geometry prediction error, a fine texture prediction error, or a coarse texture prediction error. In some embodiments, the prediction error can include at least one of a fine normal prediction error, a coarse normal prediction error, a fine attribute prediction error, or a coarse attribute prediction error.

At operation 1910, the basemesh decoder can assign one or more contexts for decoding the one or more codewords corresponding to the one or more prediction errors. In at least one embodiment, the one or more contexts can be context models that are probability models for one or more bins of the one or more codewords (e.g., TU+EG codeword). That is, the context stores the probability of each bin being a '1' or a '0'.

At operation 1915, the basemesh decoder can share the one or more contexts to be used for the one or more prediction errors associated with the fine category or the coarse category. That is, as described with reference to FIGS. 18A-D, the system can share contexts across the "fine" and "coarse categories," across geometry and texture prediction errors, and across multiple bin positions within a portion of the codeword.

For example, the basemesh decoder can share the one or more contexts to be used between at least one of the fine geometry prediction error, the coarse geometry prediction error, the fine texture prediction error, or the coarse texture prediction error.

In some embodiments, multiple bin positions within the truncated unary binarization share a same context of the one or more contexts. In some cases, there are three contexts associated with the portion of the codeword associated with the truncated unary binarization. In such cases, three contexts are used for the coarse category and a subset of the three contexts is used for the fine category—e.g., the fine category uses two contexts. In some embodiments, there are a first number of bins for the truncated unary binarization associated with the fine category and a second number of bins for the truncated unary binarization associated with the coarse category.

In at least one embodiment, multiple bin positions within the exponential Golomb prefix binarization share a same context of the one or more contexts. In some embodiments, there are five contexts associated with the portion of the codeword associated with the exponential Golomb prefix binarization. In such embodiments, five contexts are used for a first prediction error type of the one or more prediction errors and a subset of the five contexts is used for a second prediction error type of the one or more prediction errors. In one example, the first prediction error type is a geometry prediction error and the second prediction error type is a texture coordinate prediction error. In at least one embodiment, the subset of the five contexts is four contexts for the second prediction error type.

In at least one embodiment, multiple bin positions within the exponential Golomb suffix binarization share a same context of the one or more contexts. In some embodiments, there are five contexts associated with the portion of the codeword associated with the exponential Golomb suffix binarization. In such embodiments, five contexts are used for a first prediction error type of the one or more prediction errors and a subset of the five contexts is used for a second prediction error type of the one or more prediction errors. In one example, the first prediction error type is a geometry prediction error and the second prediction error type is a texture coordinate prediction error. In at least one embodiment, the subset of the five contexts is four contexts for the second prediction error type.

Figure 20:
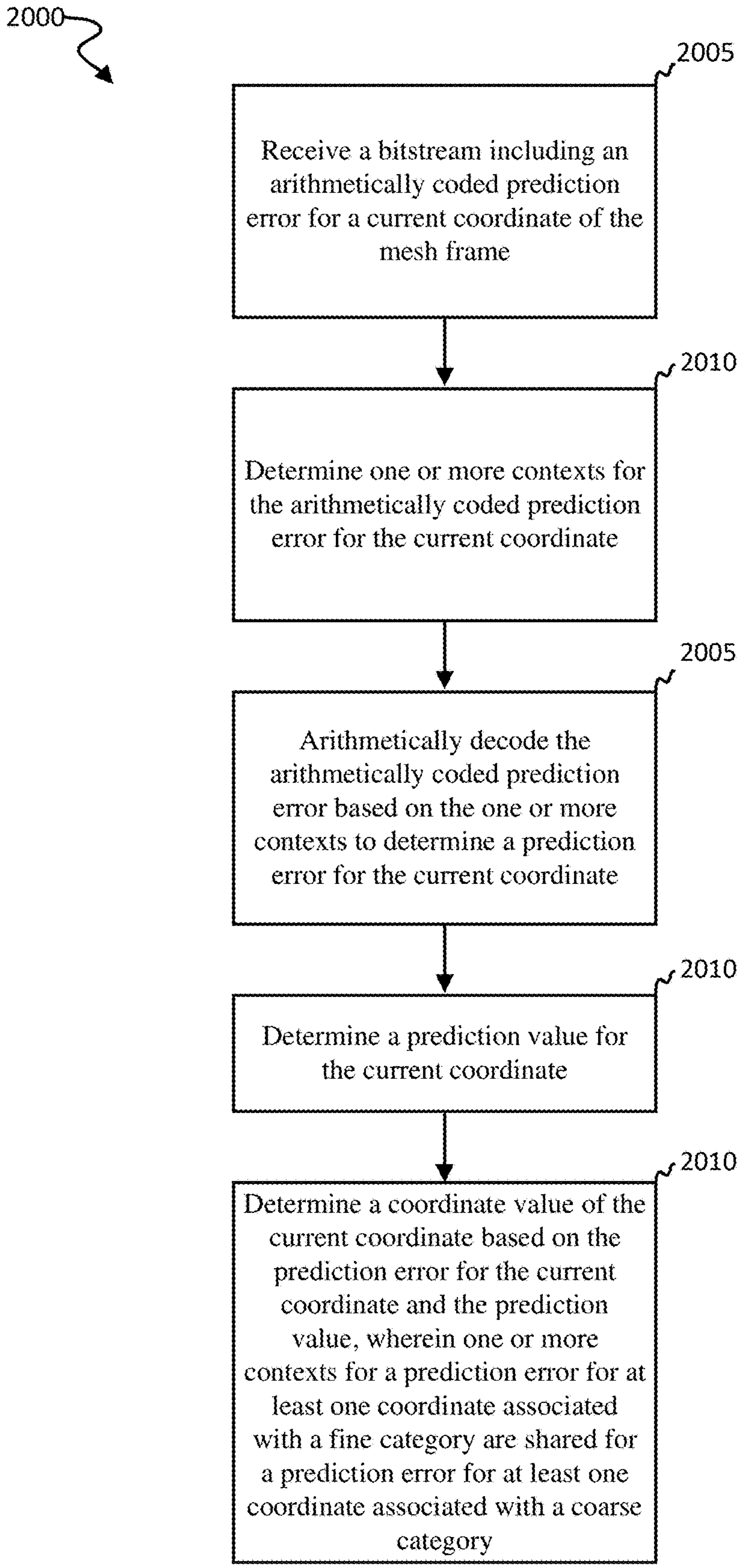
FIG. 20 illustrates a flowchart showing operations of a basemesh decoder in accordance with an embodiment.

FIG. 20 is a flowchart showing operations of a V-DMC decoder in accordance with an embodiment.

At operation 2005, the V-DMC decoder receives a bitstream including an arithmetically coded prediction error for a current coordinate of the mesh frame.

In some embodiments, the current coordinate may be one of a geometry coordinate associated with a fine category, a geometry coordinate associated with a coarse category, a texture coordinate associated with a fine category, or a texture coordinate associated with a coarse category. In some embodiments, the current coordinate may be one of a material property coordinate associated with a fine category, a material property coordinate associated with a coarse category, a normal coordinate associated with a fine category, or a normal coordinate associated with a coarse category.

In some embodiments, the arithmetically coded prediction error may be one of a geometry coordinate prediction error associated with a fine category mesh_position_fine_residual, a geometry coordinate prediction error associated with a coarse category mesh_position_coarse_residual, a texture coordinate prediction error associated with a fine category mesh_attribute_fine_residual, or a texture coordinate prediction error associated with a coarse category mesh_attribute_coarse_residual.

At operation 2010, the V-DMC decoder determines one or more contexts for the arithmetically coded prediction error for the current coordinate.

In some embodiments, the V-DMC decoder determines one or more contexts for the prediction error for the current coordinate as described above, for example, in FIGS. 16A to 18D and Tables 1 and 2. For example, when the V-DMC decoder arithmetically encodes a respective one bin of bins of the prediction error, the V-DMC decoder may determine a context identified by the context index ctxIdx in the context table ctxTbl for the prediction error or may determine a bypass as the context for the prediction error, as shown in Table 1 or Table 2.

In some embodiments, one or more contexts for a prediction error for at least one geometry coordinate may be shared for a prediction error for at least one texture coordinate.

In some embodiments, one or more contexts for a truncated unary part of a prediction error for at least one coordinate associated with a fine category may be shared for a truncated unary part of a prediction error for at least one coordinate associated with a coarse category.

In some embodiments, one or more contexts for a prefix part of a prediction error for at least one coordinate associated with a fine category may be shared for a prefix part of a prediction error for at least one coordinate associated with a coarse category.

In some embodiments, one or more contexts for a suffix part of a prediction error for at least one coordinate associated with a fine category may be shared for a suffix part of a prediction error for at least one coordinate associated with a coarse category.

At operation 2015, the V-DMC decoder arithmetically decodes the arithmetically coded prediction error based on the one or more contexts to determine a prediction error for the current coordinate.

At operation 2020, the V-DMC decoder determines a prediction value for the current coordinate.

At operation 2025, the V-DMC decoder determines a coordinate value of the current coordinate based on the prediction error for the current coordinate and the prediction value for the current coordinate.

In some embodiments, the V-DMC decoder may determine a sum of the prediction error and the prediction value as the coordinate value of the current coordinate.

Figure 21:
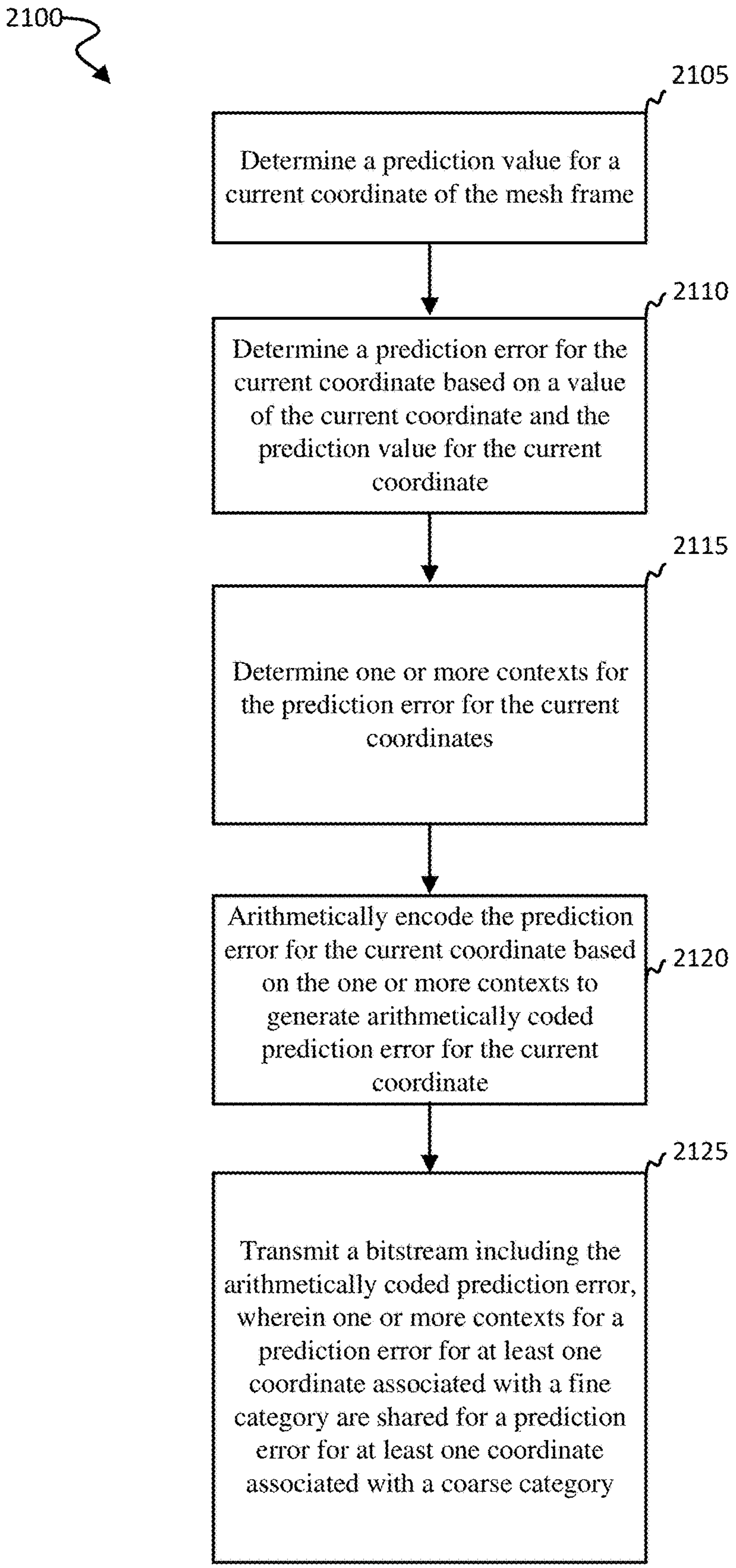
FIG. 21 illustrates a flowchart showing operations of a basemesh encoder in accordance with an embodiment.

FIG. 21 is a flowchart showing operations of a V-DMC encoder in accordance with an embodiment.

In some embodiments, the operations of FIG. 21 may be performed by the V-DMC encoder.

At operation 2105, the V-DMC encoder determines a prediction value for a current coordinate of the mesh frame.

In some embodiments, the current coordinate may be one of a geometry coordinate associated with a fine category, a geometry coordinate associated with a coarse category, a texture coordinate associated with a fine category, or a texture coordinate associated with a coarse category. In some embodiments, the current coordinate may be one of a material property coordinate associated with a fine category, a material property coordinate associated with a coarse category, a normal coordinate associated with a fine category, or a normal coordinate associated with a coarse category.

At operation 2110, the V-DMC encoder determines a prediction error for the current coordinate based on a coordinate value of the current coordinate and the prediction value for the current coordinate.

In some embodiments, the V-DMC encoder subtracts the prediction value from the coordinate value of the current coordinate to determine the prediction error for the current coordinate.

At operation 2115, the V-DMC encoder determines one or more contexts for the prediction error for the current coordinate.

In some embodiments, the V-DMC encoder determines one or more contexts for the prediction error for the current coordinate as described above, for example, in FIGS. 16A to 18D and Tables 1 and 2. For example, when the V-DMC encoder arithmetically encodes a respective one bin of bins of the prediction error, the V-DMC encoder may determine a context identified by the context index ctxIdx in the context table ctxTbl for the prediction error or may determine a bypass as the context for the prediction error, as shown in Table 1 or Table 2.

In some embodiments, one or more contexts for a prediction error for at least one geometry coordinate may be shared for a prediction error for at least one texture coordinate.

In some embodiments, one or more contexts for a truncated unary part of a prediction error for at least one coordinate associated with a fine category may be shared for a truncated unary part of a prediction error for at least one coordinate associated with a coarse category.

In some embodiments, one or more contexts for a prefix part of a prediction error for at least one coordinate associated with a fine category may be shared for a prefix part of a prediction error for at least one coordinate associated with a coarse category.

In some embodiments, one or more contexts for a suffix part of a prediction error for at least one coordinate associated with a fine category may be shared for a suffix part of a prediction error for at least one coordinate associated with a coarse category.

At operation 2120, the V-DMC encoder arithmetically encodes the prediction error for the current coordinate based on the one or more contexts to generate arithmetically coded prediction error for the current coordinate. In some embodiments, the arithmetically coded prediction error may be one of a geometry coordinate prediction error associated with a fine category mesh_position_fine_residual, a geometry coordinate prediction error associated with a coarse category mesh_position_coarse_residual, a texture coordinate prediction error associated with a fine category mesh_attribute_fine_residual, or a texture coordinate prediction error associated with a coarse category mesh_attribute_coarse_residual.

At operation 2125, the V-DMC encoder transmits a bitstream including the arithmetically coded prediction error.

The various illustrative blocks, units, modules, components, methods, operations, instructions, items, and algorithms may be implemented or performed with processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, the description may provide illustrative examples and the various features may be grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The embodiments are provided solely as examples for understanding the disclosed technology. They are not intended and are not to be construed as limiting the scope of the disclosed technology in any manner. Although certain embodiments and examples have been provided, it will be apparent to those skilled in the art based on the disclosures herein that changes in the embodiments and examples shown may be made without departing from the scope of the disclosed technology.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for decoding a basemesh frame, comprising:

arithmetically decoding one or more codewords corresponding to one or more prediction errors associated with the basemesh frame, wherein the one or more prediction errors are associated with a fine category or a coarse category;

assigning one or more contexts for decoding the one or more codewords corresponding to the one or more prediction errors; and sharing the one or more contexts to be used for the one or more prediction errors associated with the fine category or the coarse category.

2. The computer-implemented method of claim 1, wherein the one or more prediction errors includes at least one of a fine geometry prediction error, a coarse geometry prediction error, a fine texture prediction error, or a coarse texture prediction error, and wherein the method further comprises:

sharing the one or more contexts to be used between at least one of the fine geometry prediction error, the coarse geometry prediction error, the fine texture prediction error, or the coarse texture prediction error.

3. The computer-implemented method of claim 1, wherein the one or more codewords includes one or more portions, wherein a portion of the one or more portions is associated with a truncated unary binarization, and wherein multiple bin positions within the truncated unary binarization share a same context of the one or more contexts.

4. The computer-implemented method of claim 3, wherein there are three contexts of the one or more contexts associated with the portion of the one or more codewords, wherein the three contexts are used for the coarse category, and wherein a subset of the three contexts is used for the fine category.

5. The computer-implemented method of claim 3, wherein there are a first number of bins for the truncated unary binarization associated with a fine texture prediction error and a second number of bins for the truncated unary binarization associated with a coarse texture prediction error, wherein the first number is greater than the second number.

6. The computer-implemented method of claim 1, wherein the one or more codewords includes one or more portions, wherein a portion of the one or more portions is associated with an exponential Golomb prefix binarization, and wherein multiple bin positions within the exponential Golomb prefix binarization share a same context of the one or more contexts.

7. The computer-implemented method of claim 6, wherein there are five contexts of the one or more contexts associated with the portion of the one or more codewords, wherein the five contexts are used for a first prediction error type of the one or more prediction errors, and wherein a subset of the five contexts is used for a second prediction error type of the one or more prediction errors.

8. The computer-implemented method of claim 1, wherein the one or more codewords includes one or more portions, wherein a portion of the one or more portions is associated with an exponential Golomb suffix binarization, and wherein multiple bin positions within the exponential Golomb suffix binarization share a same context of the one or more contexts.

9. The computer-implemented method of claim 8, wherein there are five contexts of the one or more contexts associated with the portion of the one or more codewords, wherein the five contexts are used for a first prediction error type of the one or more prediction errors, and wherein a subset of the five contexts is used for a second prediction error type of the one or more prediction errors.

10. The computer-implemented method of claim 1, wherein the one or more prediction errors includes at least one of a fine normal prediction error, a coarse normal prediction error, a fine attribute prediction error, or a coarse attribute prediction error.

11. An apparatus for decoding a mesh frame, comprising a processor configured to cause:

receive a bitstream including an arithmetically coded prediction error for a current coordinate of the mesh frame;

determine one or more contexts for the arithmetically coded prediction error for the current coordinate;

arithmetically decode the arithmetically coded prediction error based on the one or more contexts to determine a prediction error for the current coordinate;

determine a prediction value for the current coordinate; and determine a coordinate value of the current coordinate based on the prediction error for the current coordinate and the prediction value for the current coordinate, wherein one or more contexts for a prediction error for at least one coordinate associated with a fine category are shared for a prediction error for at least one coordinate associated with a coarse category.

12. The apparatus of claim 11, wherein one or more contexts for a prediction error for at least one geometry coordinate are shared for a prediction error for at least one texture coordinate.

13. The apparatus of claim 11, wherein one or more contexts for a truncated unary part of the prediction error for at least one coordinate associated with the fine category are shared for a truncated unary part of the prediction error for at least one coordinate associated with the coarse category.

14. The apparatus of claim 11, wherein one or more contexts for a prefix part of the prediction error for at least one coordinate associated with the fine category are shared for a prefix part of the prediction error for at least one coordinate associated with the coarse category.

15. The apparatus of claim 11, wherein one or more contexts for a suffix part of the prediction error for at least one coordinate associated with the fine category are shared for a suffix part of a prediction error for at least one coordinate associated with the coarse category.

16. An apparatus for encoding a mesh frame, comprising a processor configured to cause:

determine a prediction value for a current coordinate of the mesh frame;

determine a prediction error for the current coordinate based on a value of the current coordinate and the prediction value for the current coordinate;

determine one or more contexts for the prediction error for the current coordinate;

arithmetically encode the prediction error for the current coordinate based on the one or more contexts to generate arithmetically coded prediction error for the current coordinate; and transmit a bitstream including the arithmetically coded prediction error, wherein one or more contexts for a prediction error for at least one coordinate associated with a fine category are shared for a prediction error for at least one coordinate associated with a coarse category.

17. The apparatus of claim 16, wherein one or more contexts for a prediction error for at least one geometry coordinate are shared for a prediction error for at least one texture coordinate.

18. The apparatus of claim 16, wherein one or more contexts for a truncated unary part of the prediction error for at least one coordinate associated with the fine category are shared for a truncated unary part of the prediction error for at least one coordinate associated with the coarse category.

19. The apparatus of claim 16, wherein one or more contexts for a prefix part of the prediction error for at least one coordinate associated with the fine category are shared for a prefix part of the prediction error for at least one coordinate associated with the coarse category.

20. The apparatus of claim 16, wherein one or more contexts for a suffix part of the prediction error for at least one coordinate associated with the fine category are shared for a suffix part of the prediction error for at least one coordinate associated with the coarse category.

* * * * *